US012644479B2

(12) United States Patent
Nishida et al.

(10) Patent No.: US 12,644,479 B2
(45) Date of Patent: Jun. 2, 2026

(54) FASTENING STRUCTURE OF FIBER REINFORCED RESIN-MADE MEMBER

(71) Applicant: MAZDA MOTOR CORPORATION, Hiroshima (JP)

(72) Inventors: Kenji Nishida, Aki-gun (JP); Kenichi Yamamoto, Aki-gun (JP); Chikara Kawamura, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 695 days.

(21) Appl. No.: 18/179,938

(22) Filed: Mar. 7, 2023

(65) Prior Publication Data

US 2023/0332633 A1    Oct. 19, 2023

(30) Foreign Application Priority Data

Apr. 18, 2022    (JP) ................................. 2022-068127

(51) Int. Cl.
*F16B 5/02* (2006.01)

(52) U.S. Cl.
CPC ................................. *F16B 5/0225* (2013.01)

(58) Field of Classification Search
CPC .... F16B 5/0208; F16B 5/0216; F16B 5/0225; F16B 5/025; F16B 13/04; F16B 13/045; B62D 25/082; B62D 25/088; B62D 29/005; B62D 29/048; B62D 21/155; B62D 21/152
See application file for complete search history.

(56) References Cited

U.S. PATENT DOCUMENTS

| | | | | |
|---|---|---|---|---|
| 4,432,680 | A * | 2/1984 | Molina | F16B 5/0208 411/105 |
| 4,950,031 | A * | 8/1990 | Mizunaga | B62D 21/152 296/187.11 |
| 5,018,920 | A * | 5/1991 | Speakman | F16B 5/04 411/383 |
| 7,021,876 | B2 * | 4/2006 | Gulistan | F16B 5/0208 411/105 |

(Continued)

FOREIGN PATENT DOCUMENTS

| | | | | |
|---|---|---|---|---|
| DE | 102016204662 A1 * | 9/2017 | | F16B 29/00 |
| JP | 2002308149 A * | 10/2002 | | |

(Continued)

*Primary Examiner* — Jonathan P Masinick

(74) *Attorney, Agent, or Firm* — Studebaker Brackett PLLC

(57) ABSTRACT

An outer member, an inner member, and an inside fixing member overlap each other and fastened together by a fastening member. The outer member is made of fiber reinforced resin, and fibers contained in the fiber reinforced resin-made outer member are arranged in a direction crossing the above-described overlapping direction. A bolt of the fastening member comprises a conical (truncated cone-shaped) middle portion which is poisoned between a head portion and a shaft portion. In a case where the outer member and the bolt are offset from each other in a radial direction of a through hole of the outer member, the conical middle portion partially contacts an edge portion of the through hole and compress a contacted portion of the outer member in the overlapping direction.

10 Claims, 14 Drawing Sheets

(56)　　　　　References Cited

U.S. PATENT DOCUMENTS

| | | | | |
|---|---|---|---|---|
| 7,390,047 | B2 * | 6/2008 | Hanakawa | B62D 25/088 |
| | | | | 296/203.02 |
| 7,523,980 | B2 * | 4/2009 | Okamoto | B62D 27/065 |
| | | | | 470/57 |
| 8,814,236 | B2 * | 8/2014 | Kors | B60R 19/24 |
| | | | | 293/133 |
| 9,498,855 | B2 * | 11/2016 | Gordon | B23P 11/025 |
| 10,093,358 | B2 * | 10/2018 | Tani | B62D 21/03 |
| 10,604,094 | B2 * | 3/2020 | Kawamura | B60R 19/03 |
| 11,092,178 | B2 * | 8/2021 | Muramatsu | F16B 43/02 |
| 11,858,555 | B2 * | 1/2024 | Nishida | B62D 25/14 |
| 12,122,453 | B2 * | 10/2024 | Nishida | B62D 29/04 |
| 2003/0082025 | A1 * | 5/2003 | Luhm | F16B 19/1045 |
| | | | | 411/43 |
| 2008/0078864 | A1 * | 4/2008 | Wilkerson | B64D 45/02 |
| | | | | 244/1 A |
| 2010/0254753 | A1 * | 10/2010 | Mulholland | F16B 5/025 |
| | | | | 403/254 |
| 2015/0277432 | A1 * | 10/2015 | Ikeda | B29C 66/9672 |
| | | | | 700/97 |
| 2016/0108943 | A1 * | 4/2016 | Knutson | F16B 5/0225 |
| | | | | 403/108 |
| 2017/0073019 | A1 * | 3/2017 | Kabayama | B62D 25/2027 |
| 2018/0370576 | A1 * | 12/2018 | Shibata | B62D 25/088 |
| 2020/0062315 | A1 * | 2/2020 | Matsuoka | B62D 21/11 |
| 2020/0263752 | A1 * | 8/2020 | Miura | F16F 7/12 |
| 2021/0164508 | A1 | 6/2021 | Ookubo et al. | |
| 2023/0349405 | A1 * | 11/2023 | Kamachi | F16B 35/041 |

FOREIGN PATENT DOCUMENTS

| | | | | | |
|---|---|---|---|---|---|
| JP | 2006007912 | A | * | 1/2006 | |
| WO | WO-2014069108 | A1 | * | 5/2014 | B62D 29/041 |
| WO | 2019/058459 | A1 | | 3/2019 | |

* cited by examiner

Second Direction

First Direction

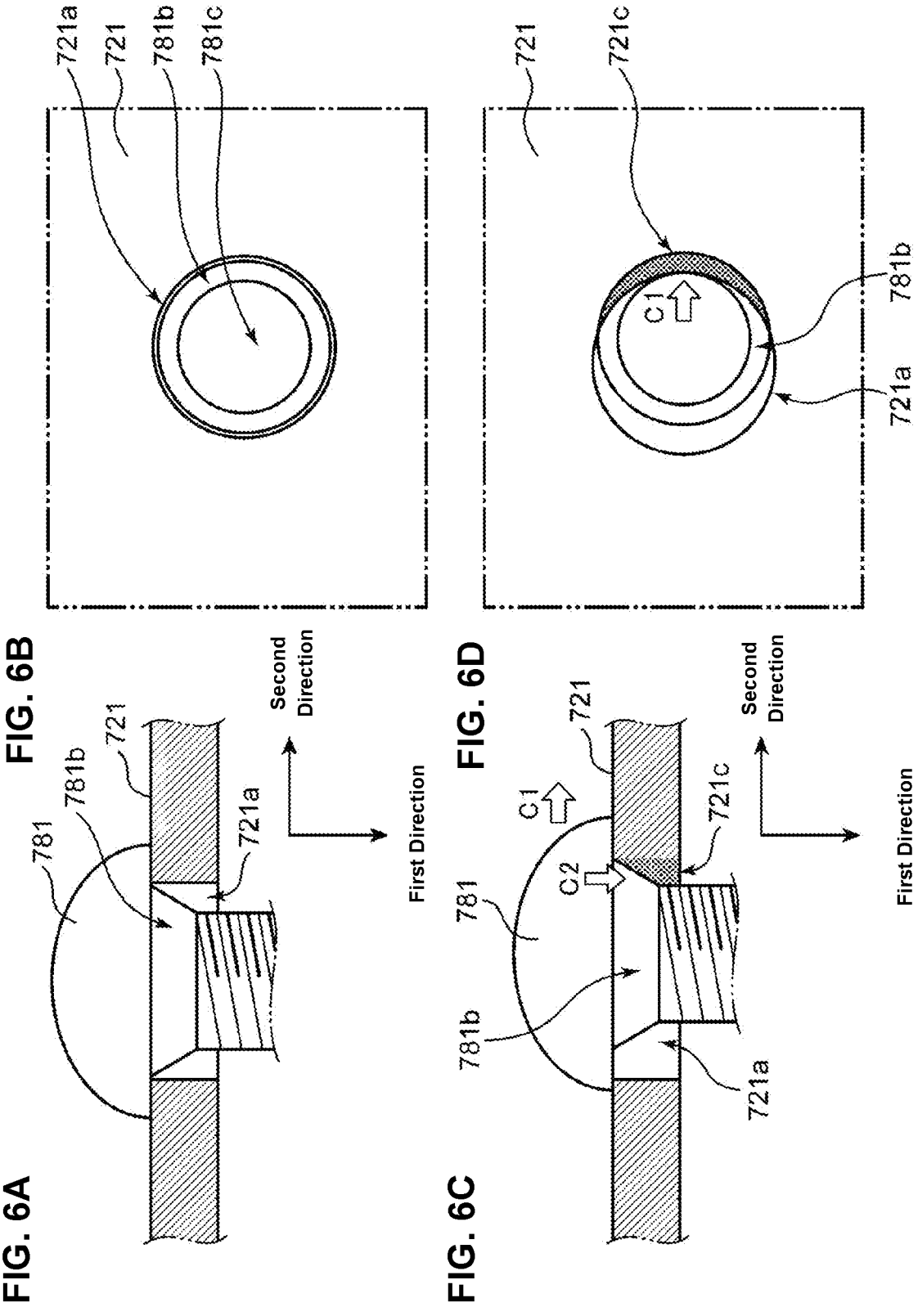

Second Direction

First Direction

Second Direction

First Direction

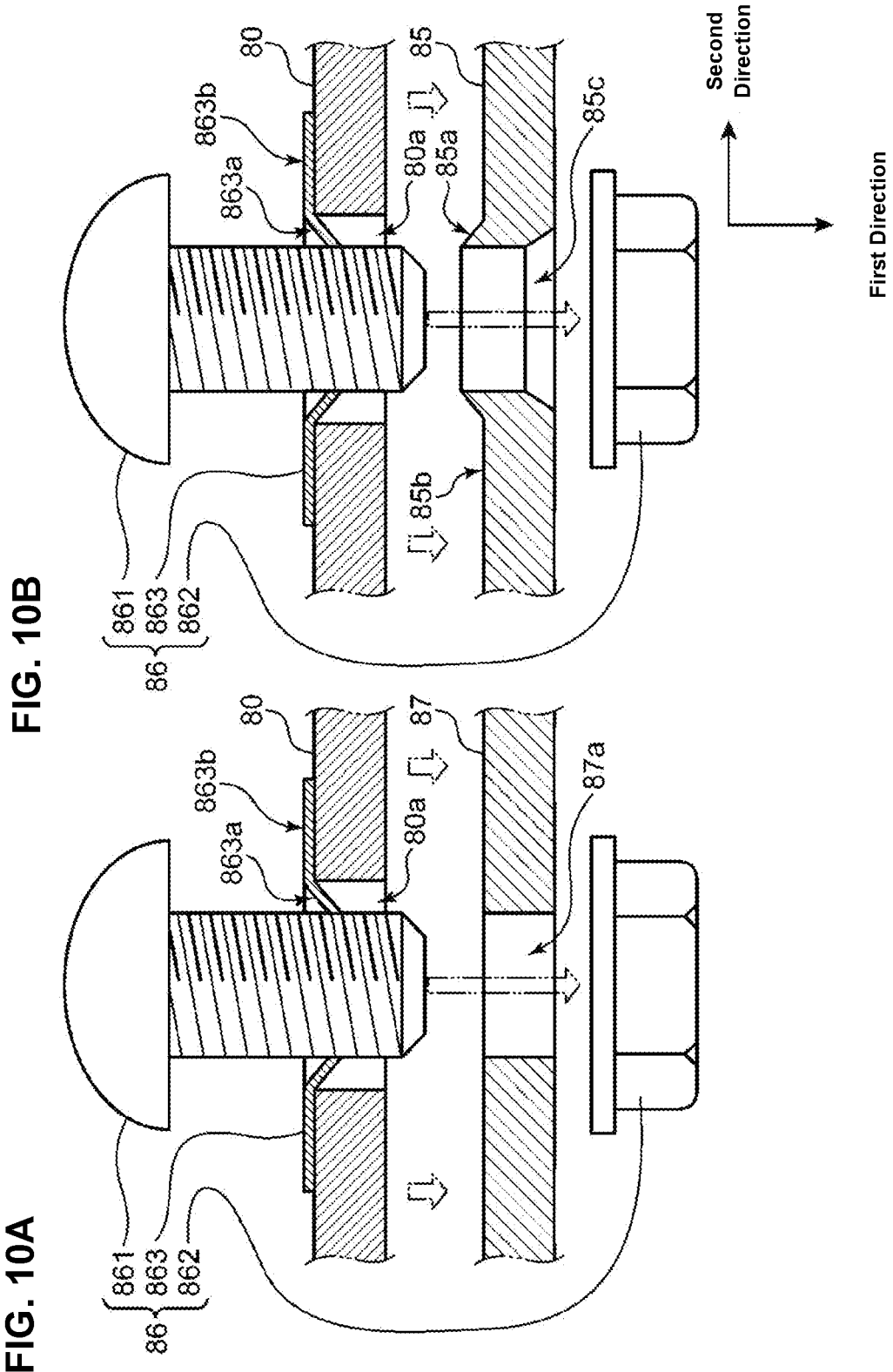

FASTENING STRUCTURE OF FIBER REINFORCED RESIN-MADE MEMBER

BACKGROUND OF THE INVENTION

The present invention relates to a fastening structure of a fiber reinforced resin-made member.

The fiber reinforced resin-made member (which is called a FRP member in some cases) is often used as a structural member of automotive vehicles, aircrafts, or industrial machines. There is a case where this fiber reinforced resin-made member is fastened to another member by using a fastening member, such as a bolt and nut or rivet. A fastening structure of the fiber reinforced resin-made member according to prior art will be described referring to FIG. 14.

In an example shown in FIG. 14A, a plate-shaped fiber reinforced resin-made member 90 and a plate-shaped metal-made member 91 overlap each other in a thick direction and fastened together by a fastening member 92. The fiber reinforced resin-made member 90 is a member in which contained fibers are arranged in a direction crossing its overlapping direction with the metal-made member 91, which has a through hole 90a penetrating in the thick direction. The metal-made member 91 has a through hole 91a which becomes continuous to the above-described through hole 90a when these members 90, 91 are provided to overlap each other.

The fastening member 92 is composed of a bolt 921 and a nut 922. A shaft portion 921c of the bolt 921 is inserted into the through holes 90a, 91a and threaded to the nut 922 outside the metal-made member 91.

As shown in FIG. 14A, a hole diameter of the through hole 90a of the fiber reinforced resin-made member 90 is set to be larger than an outer diameter of the shaft portion 921c of the bolt 921. Accordingly, in a case where a force shown by an arrow E1 is applied to the fiber reinforced resin-made member 90 and the fastening member 92, there is a case where the fastening member 92 is offset, in a radial direction, from the through hole 90a of the fiber reinforced resin-made member 90 as shown in FIG. 14B. In this case, the shaft portion 921c of the bolt 921 may hit against an edge portion 90b of the through hole 90a of the fiber reinforced resin-made member 90 (E2) as shown in FIG. 14B. When this hitting occurs, a stress concentration on a single point (shown by E2) of the fiber reinforced resin-made member 90 is caused, so that there is a concern that the fibers contained in the fiber reinforced resin-made member 90 may be bent (buckling) improperly.

A structure disclosed in a patent document of WO2019/058459 (US2021/0164508 A1) may be considered as one of countermeasures for the above-described problem. This structure comprises two collars which are laminated in a radial direction of a through hole formed at a fiber reinforced resin-made member. The outside collar which is arranged on an outer peripheral side has a slit which is formed at a part, in a peripheral direction, thereof. The inside collar is configured to apply a pressing force to press the outside collar against a whole edge portion of the through hole of the fiber reinforced resin-made member. It may be considered that providing the above-described collars can suppress occurrence of the stress concentration on the single point of the edge portion of the fiber reinforced resin-made member even in a case where the fiber reinforced resin-made member and the fastening member are offset, in the radial direction of the through hole, from each other.

However, the above-described provision of the collars may cause an increase of costs because the number of parts increases and/or the manufacturing steps becomes complex. Specifically, since the collars proposed by the above-described patent document need to be provided for the through hole of the fiber reinforced resin-made member where the fastening member is inserted, the parts number may increase considerably. Moreover, since the above-described collars are applied to the edge portion of the through hole of the fiber reinforced resin-made member by using an adhesive agent, the complex manufacturing steps may be caused.

SUMMARY OF THE INVENTION

The present invention has been devised in view of the above-described problems, and an object of the present invention is to provide a fastening structure of a fiber reinforced resin-made member which can properly suppress buckling of the fiber reinforced resin-made member even in the case where the fiber reinforced resin-made member and the fastening member are offset, in the radial direction of the through hole, from each other, without costs increasing.

The fastening structure of the fiber reinforced resin-made member according to a first aspect of the present invention comprises a fiber reinforced resin-made member, another member overlapping with the fiber reinforced resin-made member, and a fastening member fastening the fiber reinforced resin-made member and the other member, wherein the fiber reinforced resin-made member has a through hole penetrating in a first direction which corresponds to a direction of the overlapping and contains fibers which are arranged in a direction crossing the first direction, the other member has a hole portion which is continuous to the through hole of the fiber reinforced resin-made member, the fastening member is inserted into the through hole of the fiber reinforced resin-made member and the hole portion of the other member so as to fasten the fiber reinforced resin-made member and the other member, and the fastening member comprises a compression portion which is configured to partially contact an edge portion of the through hole of the fiber reinforced resin-made member in a case where the fastening member is offset from the fiber reinforced resin-made member and compress a contacted portion of the fiber reinforced resin-made member in the first direction.

According to this structure, since the fastening member comprises the compression portion, in the case where the fastening member is offset from the fiber reinforced resin-made member (in the radial direction of the through hole) and the compression portion contacts the edge portion of the fiber reinforced resin-made member, the contacted portion of the fiber reinforced resin-made member is compressed in the first direction. Since the contained fibers of the fiber reinforced resin-made member are arranged in the direction crossing the first direction (in a crossing direction), the buckling of the fibers at a compressed point where the contacted portion of the fiber reinforced resin-made member is compressed in the first direction can be suppressed, so that the compression strength, in a direction of fiber's length, of the fiber reinforced resin-made member can be utilized efficiently. Thereby, the fiber's density at the compressed point so increases that the strength of the contacted portion of the fiber reinforced resin-made member against a force applied in the above-described offset direction (the crossing direction) can be improved.

Accordingly, the above-described fastening structure of the fiber reinforced resin-made member can properly suppress the buckling of the fiber reinforced resin-made member in the case where the fastening member is offset from the fiber reinforced resin-made member, without applying the collars proposed by the above-described patent document to the through hole of the fiber reinforced resin-made member.

In the fastening structure of the fiber reinforced resin-made member according to the first aspect of the present invention, the following embodiment may be applied. That is, the fastening member comprises a head portion with a diameter larger than the through hole of the fiber reinforced resin-made member, a shaft portion extending in an opposite direction to the head portion, and a conical middle portion provided continuously between the head portion and the shaft portion and being configured such that a diameter of a lateral cross section thereof decreases gradually from the head portion toward the shaft portion, the fastening member is arranged such that the head portion is positioned on an opposite side to the other member relative to the fiber reinforced resin-made member and the conical middle portion is positioned inside the through hole of the fiber reinforced resin-made member, and the compression portion of the fastening member is configured to be the conical middle portion.

In this embodiment, the fastening member comprises the conical middle portion and this conical middle portion serves as the above-described compression portion. Thereby, in the case where the fastening member is offset from the fiber reinforced resin-made member (in the radial direction of the through hole) and the conical middle portion of the fastening member partially contacts the edge portion of the through hole of the fiber reinforced resin-made member, the contacted portion of the fiber reinforced resin-made member is compressed in the first direction when receiving a compressive force from the conical middle portion as the compression portion. Accordingly, the fastening structure of the fiber reinforced resin-made member of this embodiment can properly suppress the buckling of the fiber reinforced resin-made member in the case where the fastening member is offset from the fiber reinforced resin-made member, without applying the collars proposed by the above-described patent document to the through hole of the fiber reinforced resin-made member as well.

In the fastening structure of the fiber reinforced resin-made member according to the first aspect of the present invention, the following embodiment may be also applied. That is, the fastening member includes a bolt and a nut, the nut comprises a body portion with a diameter larger than the through hole of the fiber reinforced resin-made member and a conical protrusion portion continuously protruding from the body portion in one direction such that a diameter of a lateral cross section thereof decreases gradually toward a direction away from the body portion, the nut is arranged such that the body portion is positioned on an opposite side to the other member relative to the fiber reinforced resin-made member and the conical protrusion portion is positioned inside the through hole of the fiber reinforced resin-made member, and the compression portion of the fastening member is configured to be the conical protrusion portion of the nut.

In this embodiment, the nut of the fastening member comprises the conical protrusion portion and this conical protrusion portion serves as the above-described compression portion. Thereby, in the case where the fastening member is offset from the fiber reinforced resin-made member (in the radial direction of the through hole) and the conical protrusion portion of the nut partially contacts the edge portion of the through hole of the fiber reinforced resin-made member, the contacted portion of the fiber reinforced resin-made member is compressed in the first direction when receiving a compressive force from the conical protrusion portion as the compression portion. Accordingly, the fastening structure of the fiber reinforced resin-made member of this embodiment can properly suppress the buckling of the fiber reinforced resin-made member in the case where the fastening member is offset from the fiber reinforced resin-made member, without applying the collars proposed by the above-described patent document to the through hole of the fiber reinforced resin-made member as well.

In the fastening structure of the fiber reinforced resin-made member according to the first aspect of the present invention, the following embodiment may be also applied. That is, the fastening member includes a bolt, a nut, and a washer, the washer comprises a flat portion and a conical protrusion portion, the flat portion being configured to be flat, in the direction crossing the first direction, in an area which surrounds a hole portion of the washer where a shaft portion of the bolt is inserted with a specified outward distance, in a radial direction, away from an edge of the hole portion of the washer, the conical protrusion portion being configured to protrude from the flat portion in one direction in an area between the flat portion and an edge of the hole portion of the washer such that a diameter of a lateral cross section thereof decreases gradually toward the edge of the hole portion from the flat portion and to be positioned inside the through hole of the fiber reinforced resin-made member, and the compression portion of the fastening member is configured to be the conical protrusion portion of the washer.

In this embodiment, the washer of the fastening member comprises the conical protrusion portion and this conical protrusion portion serves as the above-described compression portion. Thereby, in the case where the fastening member is offset from the fiber reinforced resin-made member (in the radial direction of the through hole) and the conical protrusion portion of the washer partially contacts the edge portion of the through hole of the fiber reinforced resin-made member, the contacted portion of the fiber reinforced resin-made member is compressed in the first direction when receiving a compressive force from the conical protrusion portion as the compression portion. Accordingly, the fastening structure of the fiber reinforced resin-made member of this embodiment can properly suppress the buckling of the fiber reinforced resin-made member in the case where the fastening member is offset from the fiber reinforced resin-made member, without applying the collars proposed by the above-described patent document to the through hole of the fiber reinforced resin-made member as well.

In the fastening structure of the fiber reinforced resin-made member according to the first aspect of the present invention, the following embodiment may be also applied. That is, the other member comprises a flat portion and a second conical protrusion portion, the flat portion being configured to be flat in an area which surrounds the hole portion thereof with a specified outward distance, in a radial direction, away from an edge of the hole portion thereof and to contact a main face of the fiber reinforced resin-made member, the second conical protrusion portion being configured to protrude from the flat portion in one direction in an area between the flat portion and the edge of the hole portion of the other member such that a diameter of a lateral cross section thereof decreases gradually toward the edge of the hole portion from the flat portion and to be positioned inside the through hole of the fiber reinforced resin-made member, and the second conical protrusion portion of the other member is a second compression portion which is different from the compression portion of the fastening member and configured to partially contact the edge portion of the through hole of the fiber reinforced resin-made member in a case where the fiber reinforced resin-made member and the other member are offset from each other in the radial direction and compress a contacted portion of the fiber reinforced resin-made member in the first direction.

In this embodiment, the other member comprises the second conical protrusion portion and this second conical protrusion portion serves as the above-described second compression portion. Thereby, in the case where the other member, in addition to the fastening member, is offset from the fiber reinforced resin-made member (in the radial direction of the through hole) and the second conical protrusion portion of the other member partially contacts the edge portion of the through hole of the fiber reinforced resin-made member, the contacted portion of the fiber reinforced resin-made member is compressed in the first direction when receiving a compressive force from the second conical protrusion portion as the second compression portion. Accordingly, since the strength of the edge portion of the through hole of the fiber reinforced resin-made member is improved by cooperation of the compression portion of the fastening member and the second compression portion of the other member, the fastening structure of the fiber reinforced resin-made member of this embodiment can properly suppress the buckling of the fiber reinforced resin-made member, without applying the collars proposed by the above-described patent document to the through hole of the fiber reinforced resin-made member as well.

The fastening structure of the fiber reinforced resin-made member according to a second aspect of the present invention comprises a fiber reinforced resin-made member, another member overlapping with the fiber reinforced resin-made member and configured to have larger rigidity than the fiber reinforced resin-made member, and a fastening member fastening the fiber reinforced resin-made member and the other member, wherein the fiber reinforced resin-made member has a through hole penetrating in a first direction which corresponds to a direction of the overlapping and contains fibers which are arranged in a direction crossing the first direction, and the other member has a hole portion which is continuous to the through hole of the fiber reinforced resin-made member, and the other member comprises a compression portion which is configured to partially contact an edge portion of the through hole of the fiber reinforced resin-made member in a case where the fastening member is offset from the fiber reinforced resin-made member and compress a contacted portion of the fiber reinforced resin-made member in the first direction.

According to this structure, since the other member comprises the compression portion, in the case where the fastening member is offset from the fiber reinforced resin-made member (in the radial direction of the through hole) and the compression portions of the other member contacts the edge portion of the fiber reinforced resin-made member, the contacted portion of the fiber reinforced resin-made member is compressed in the first direction. Since the fibers of the fiber reinforced resin-made member are arranged in the direction crossing the first direction (in the crossing direction), the fiber's density at a compressed point so increases that the strength of the contacted portion of the fiber reinforced resin-made member against a force applied in the above-described offset direction (the crossing direction) can be improved.

Accordingly, the above-described fastening structure of the fiber reinforced resin-made member can properly suppress the buckling of the fiber reinforced resin-made member in the case where the fastening member is offset from the fiber reinforced resin-made member, without applying the collars proposed by the above-described patent document to the through hole of the fiber reinforced resin-made member.

In the fastening structure of the fiber reinforced resin-made member according to the second aspect of the present invention, the following embodiment may be also applied. That is, the fastening member includes a bolt, and the other member comprises a flat portion and a conical protrusion portion, the flat portion being configured to be flat in an area which surrounds the hole portion of the other member where a shaft portion of the bolt is inserted with a specified outward distance, in a radial direction, away from an edge of the hole portion of the other member, the conical protrusion portion being configured to protrude from the flat portion in one direction in an area between the flat portion and the edge of the hole portion of the other member such that a diameter of a lateral cross section thereof decreases gradually toward the edge of the hole portion from the flat portion and to be positioned inside the through hole of the fiber reinforced resin-made member, and the compression portion of the other member is configured to be the conical protrusion portion of the other member.

In this embodiment, the other member comprises the conical middle portion and this conical middle portion serves as the above-described compression portion. Thereby, in the case where the other member, in addition to the fastening member, is offset from the fiber reinforced resin-made member (in the radial direction of the through hole) and the conical middle portion of the other member partially contacts the edge portion of the through hole of the fiber reinforced resin-made member, the contacted portion of the fiber reinforced resin-made member is compressed in the first direction when receiving a compressive force from the conical middle portion as the compression portion. Accordingly, the fastening structure of the fiber reinforced resin-made member of this embodiment can properly suppress the buckling of the fiber reinforced resin-made member in the case where the other member, in addition to the fastening member, is offset from the fiber reinforced resin-made member, without applying the collars proposed by the above-described patent document to the through hole of the fiber reinforced resin-made member as well.

Thus, the above-described fastening structures of the fiber reinforced resin-made member can properly suppress the buckling of the fiber reinforced resin-made member even in the case where the fiber reinforced resin-made member and the fastening member are offset, in the radial direction of the through hole, from each other, without costs increasing.

The present invention will become apparent from the following description which refers to the accompanying drawings.

BRIEF DESCRIPTION OF THE DRAWINGS

FIGS. 6A and 6B are a sectional view and a plan view which show a state where a bolt is not offset, in a radial direction, from a through hole of an outer member, and FIGS. 6C and 6D are a sectional view and a plan view which show a state where the bolt is offset, in the radial direction, from the through hole of the outer member.

FIG. 10A is a sectional view showing a fastening structure of the fiber reinforced resin-made member according to a fourth modified example, and FIG. 10B is a sectional view showing a fastening structure of the fiber reinforced resin-made member according to a fifth modified example.

DETAILED DESCRIPTION OF THE INVENTION

Figure 1:
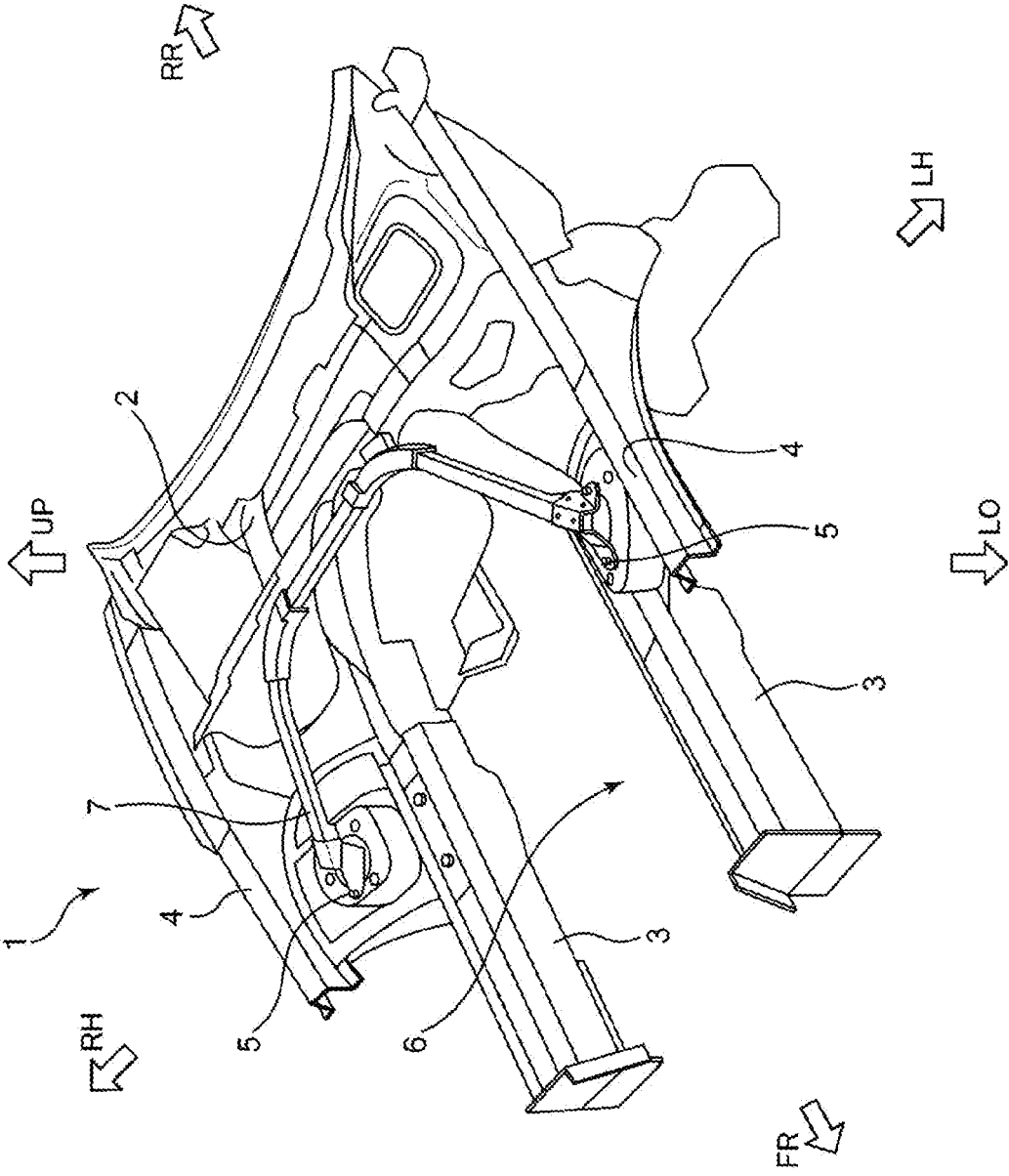
FIG. 1 is a perspective view showing a front structure of a vehicle to which a fastening structure of a fiber reinforced resin-made member according to an embodiment is applied.

Hereafter, an embodiment of the present invention will be described referring to the drawings. The following embodiment is merely one example of the present invention, and the present invention is not limited to the following embodiment except its substantial structure.

Embodiment

1. Front Structure of Vehicle 1

A front structure of a vehicle 1 to which a fastening structure of a fiber reinforced resin-made member according to the present embodiment is applied will be described referring to FIG. 1. In FIG. 1, "FR" shows a vehicle front side, "RR" shows a vehicle rear side, "LH" shows a vehicle left side, "RH" shows a vehicle right side, "UP" shows a vehicle upper side, and "LO" shows a vehicle lower side. As shown in FIG. 1, the front structure of the vehicle 1 comprises a dash panel 2, a pair of front side frames 3, a pair of apron reinforcements 4, a pair of suspension towers 5, and a strut tower bar 7. The dash panel 2 is provided to partition an engine room 6 from a cabin. The pair of front side frames 3 are provided at left-and-right both sides of the engine room 6, extending forwardly from the dash panel 2. Herein, a crash can is joined to a front end portion of each of the pair of front side frames 3, which is not illustrated.

The pair of apron reinforcements 4 are provided at the right-and-left both sides, extending in a longitudinal direction. The apron reinforcement 4 is joined to an upper portion of each of a pair of hinge pillars at its rear end portion, which is not illustrated.

The suspension tower 5 is provided between the front side frame 3 and the apron reinforcement 4 at each of the right-and-left sides. An upper portion of the suspension tower 5 is formed by a front suspension housing. The front suspension housing has a damper attachment portion where an upper end of the front suspension is attached.

The strut tower bar 7 is provided to extend in a lateral direction and interconnect the right-and-left suspension towers 5. As shown in FIG. 1, the strut tower bar 7 of the present embodiment has a roughly U shape, in a plan view, such that a central portion, in the lateral direction, thereof is positioned rearwardly from each connection portion of the strut tower bar 7 to the suspension tower 5.

2. Structure of Strut Tower Bar 7

A structure of the strut tower bar 7 will be described referring to FIGS. 2 and 3. FIG. 3 shows an exploded state of a portion shown by an arrow A in FIG. 2.

Figure 2:
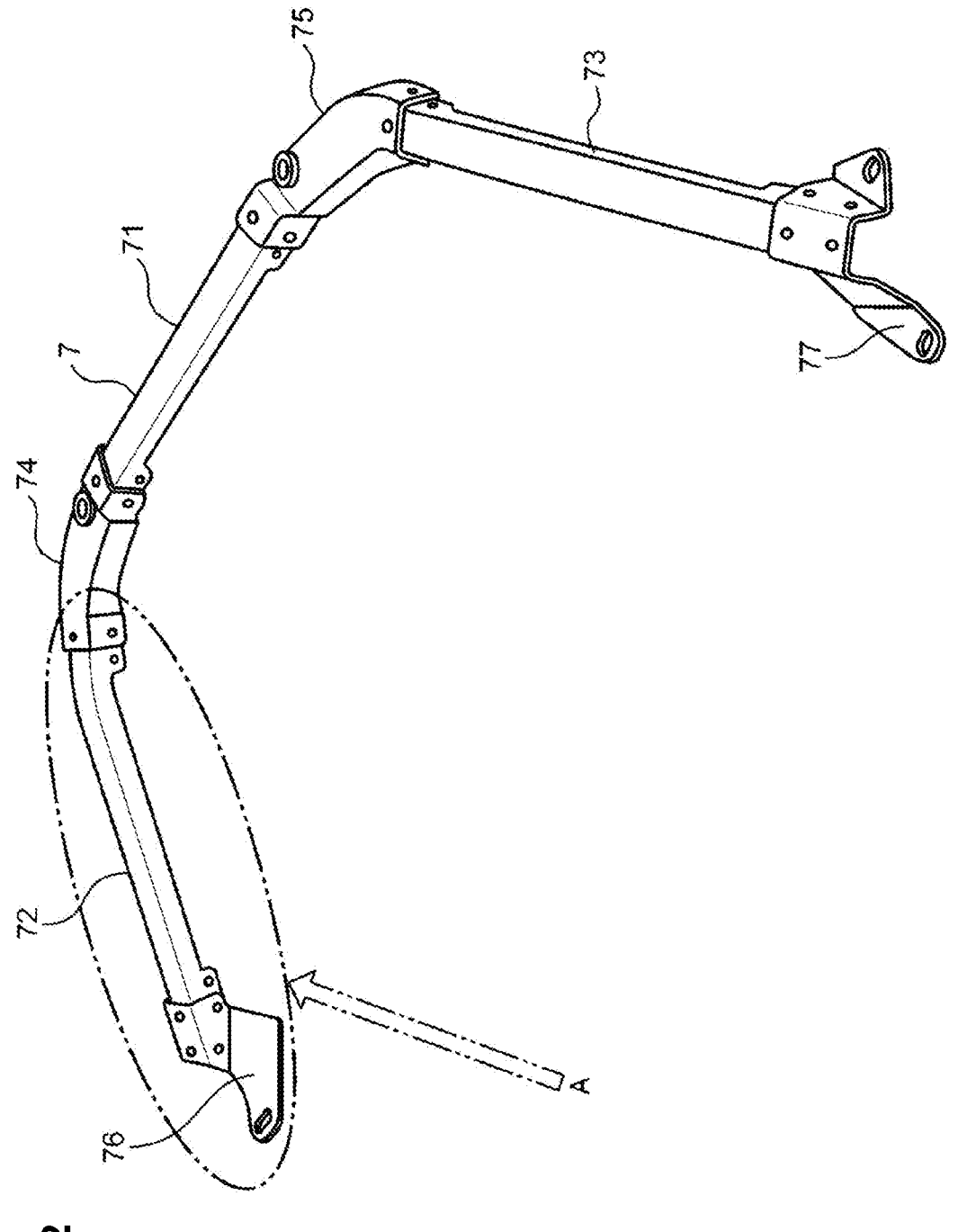
FIG. 2 is a perspective view showing a structure of a strut tower bar.
Figure 3:
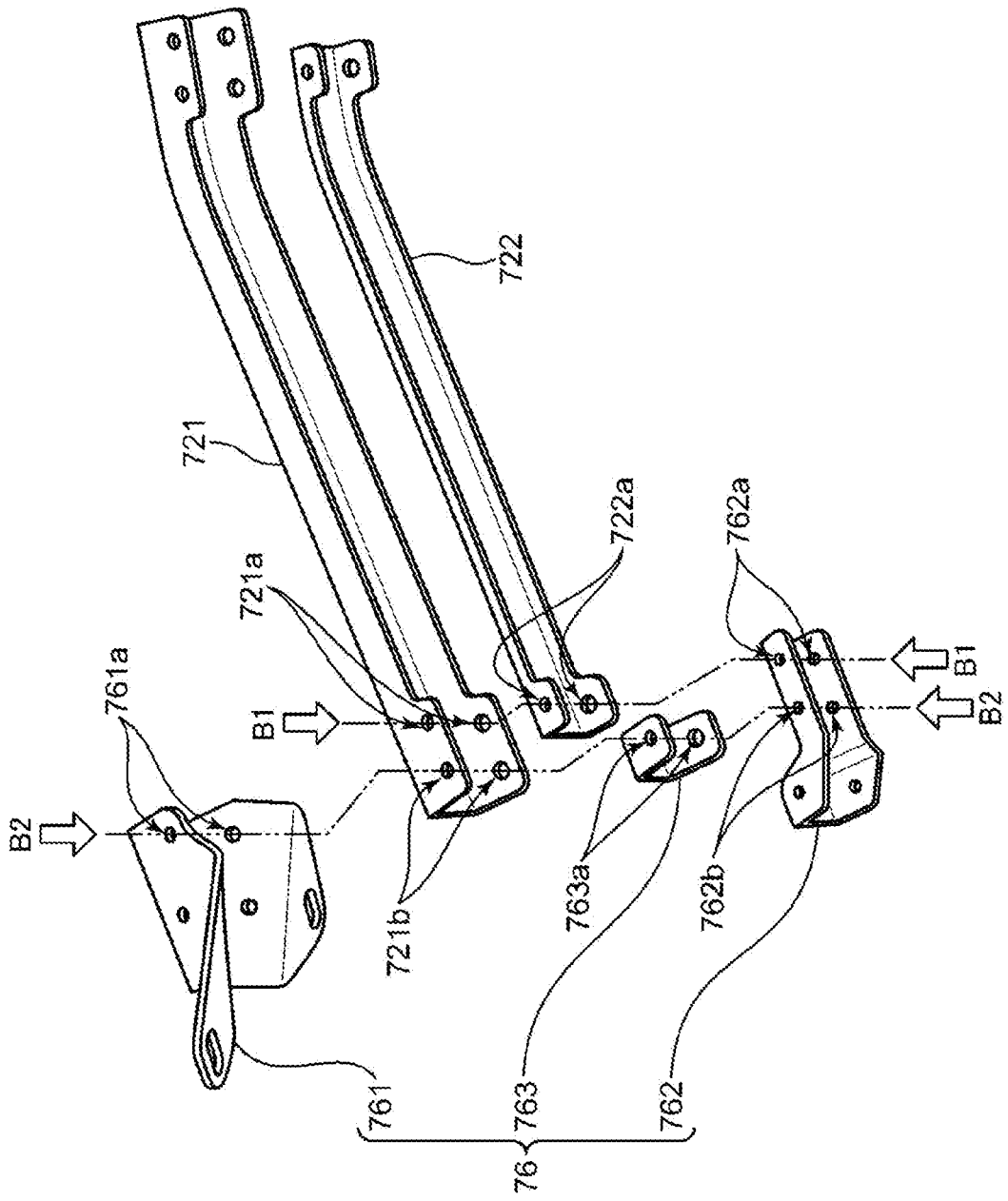
FIG. 3 is an exploded perspective view showing a partial structure of the strut tower bar.

As shown in FIG. 2, the strut tower bar 7 is formed by three bar members 71-73, two connecting members 74, 75, and two fixing members 76, 77. Fastening members, such as a blot and a nut, are used for connection of the bar members 71-73 and connection of the bar members 71-73 to the connecting members 74, 75 or the fixing members 76, 77, respectively.

As shown in FIG. 3, the bar member 72 is formed by combination of two fiber reinforced resin-made members 721, 722. Each of the fiber reinforced resin-made members 721, 722 is configured to have a roughly U-shaped cross section, and a space is generated between respective body portions of these members 721, 722 when these members 721, 722 overlap each other. The fiber reinforced resin-made member 721 is an outer member which is arranged on an outside of the strut tower bar 7, and the fiber reinforced resin-made member 722 is an inner member which is arranged on an inside of the strut tower bar 7.

The fixing member 76 is formed by combination of three metal members 761-763. The member 761 is an outside fixing member which is arranged on the outside of the strut tower bar 7, and the member 762 is an inside fixing member which is arranged on the inside of the strut tower bar 7. Further, a member 763 is a patch member which is interposed between the outside fixing member 761 and the inside fixing member 762.

Fastening of the outer member 721 and the inner member 722 and fastening of these members 721, 722 and the fixing member 76 are achieved by a first fastening portion shown by an arrow B1 and a second fastening portion shown by an arrow B2. In the present embodiment, the fastening of the first fastening portion B1 and the fastening of the second fastening portion B2 are respectively achieved by the fastening member including the bolt and the nut.

Four through holes for fastening (holes for allowing insertion of a bolt's shaft portion) are formed at the outer member 721 (through holes 721*a*, 721*b*). Two through holes for fastening (holes for allowing insertion of the bolt's shaft portion) are formed at the inner member 722 (through holes 722*a*).

Two through holes for fastening (holes for allowing insertion of the bolt's shaft portion) are formed at the outside fixing member 761 as well (through holes 761*a*). Four through holes for fastening (holes for allowing insertion of the bolt's shaft portion) are formed at the inside fixing member 762 as well (through holes 762*a*, 762*b*). Two through holes for fastening (holes for allowing insertion of the bolt's shaft portion) are formed at the patch member 763 as well (through holes 763*a*).

3. Fastening Structure of First Fastening Portion B1

A fastening structure of the first fastening portion B1 shown in FIG. 3 will be described referring to FIG. 4.

Figure 4:
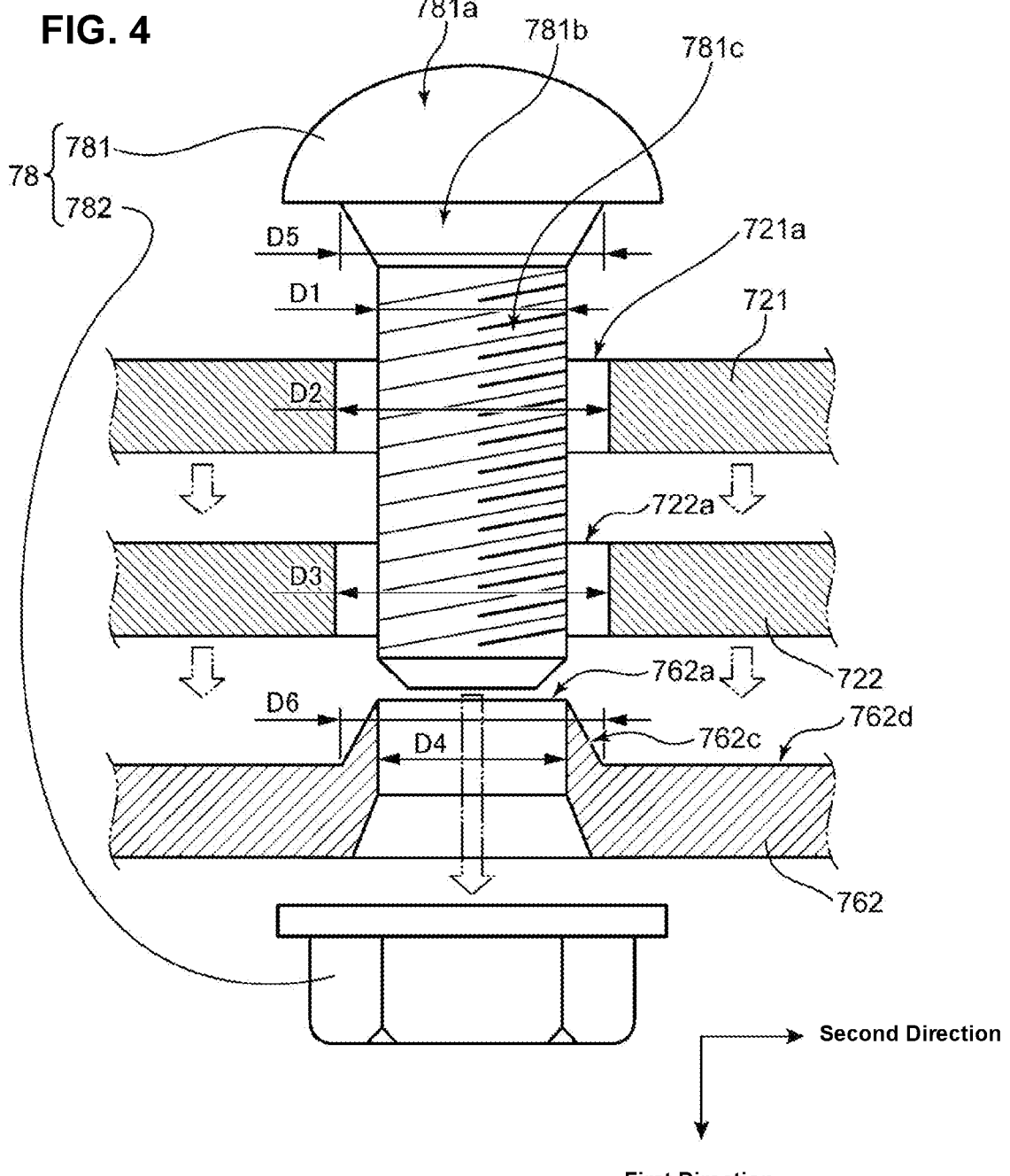
FIG. 4 is a sectional view showing the fastening structure of a portion shown by an arrow B1 in FIG. 3.

As shown in FIG. 4, at the first fastening portion B1, the outer member 721, the inner member 722, and the inside fixing member 762 overlap each other in a thickness direction and fastened together by a fastening member 78. Herein, the overlapping direction of these members 721, 722, 762 is referred to as a "first direction." Meanwhile, a direction crossing this first direction is referred to as a "second direction."

The fastening member 78 includes a bolt 781 and a nut 782. The bolt 781 is integrally formed by a head portion 781*a*, a conical middle portion 781*b*, and a shaft portion 781*c*. The head portion 781*a* has an outer diameter which is larger than an inner diameter D2 of the through hole 721*a* of the outer member 721. The shaft portion 781*c* is provided with a male screw at its peripheral face, and has an outer diameter D1 which is smaller than respective inner diameters D2-D4 of the through hole 721*a* of the outer member 721, the trough hole 722*a* of the inner member 722, and the through hole 762*a* of the inside fixing member 762.

The conical middle portion 781*b* of the bolt 781 is formed in a truncated cone shape such that a portion positioned on the side of the head portion 781*a* has the outer diameter D5 and another portion positioned on the side of the shaft portion 781*c* has the same outer diameter D1 as the shaft portion 781*c*. That is, the conical middle portion 781*b* is configured such that the diameter of its lateral cross section (the outer diameter in the second direction) decreases gradually from the head portion 781*a* toward the shaft portion 781*c*. Herein, the maximum diameter D5 of the conical middle portion 781*b* is set to be equal to or smaller than the inner diameter D2 of the through hole 721*a* of the outer member 721. Thereby, the conical middle portion 781*b* of the bolt 781 is inserted toward an inside of the through hole 721*a* of the outer member 721 together with the shaft portion 781*c*.

The inside fixing member 762 comprises a flat portion 762*d* and a conical protrusion portion 762*c*. This flat portion 762*d* is configured to be flat in an area which surrounds the through hole 762*a* with a specified outward distance, in the second direction, away from the through hole 762*c* and to contact a main face of the inner member 722 with no gap between them when it overlaps with the inner member 722. The conical protrusion portion 762*c* is configured to protrude from the flat portion 762*d* toward the through hole 722*a* of the inner member 722 in an area between the flat portion 762*d* and the through hole 762*a* of the inside fixing member 762. The conical protrusion portion 762*c* is formed in a truncated cone shape such that the diameter of its lateral cross section (the outer diameter in the second direction)

decreases gradually toward an edge portion of the through hole 762*a* from a border portion with the flat portion 762*d*. Herein, the maxim diameter D6 of the conical protrusion portion 762*c* is set to be equal to or smaller than the inner diameter D3 of the through hole 722*a* of the inner member 722. Thereby, when the inside fixing member 762 overlaps with the inner member 722, the conical protrusion portion 762*c* is inserted toward an inside of the through hole 722*a* of the inner member 722, and the flat portion 762*d* contacts the main face of the inner member 722 with no gap between them.

Herein, the conical protrusion portion 762*c* of the inside fixing member 762 is a "second conical protrusion portion" and also a "second compression portion."

The nut 782 is screwed with a tip portion of the shaft portion 781*c* of the bolt 781 which protrudes toward a back-face side of the inside fixing member 762.

4. Fastening Structure of Second Fastening Portion B2

The fastening structure of the second fastening portion B2 shown in FIG. 3 will be described referring to FIG. 5.

Figure 5:
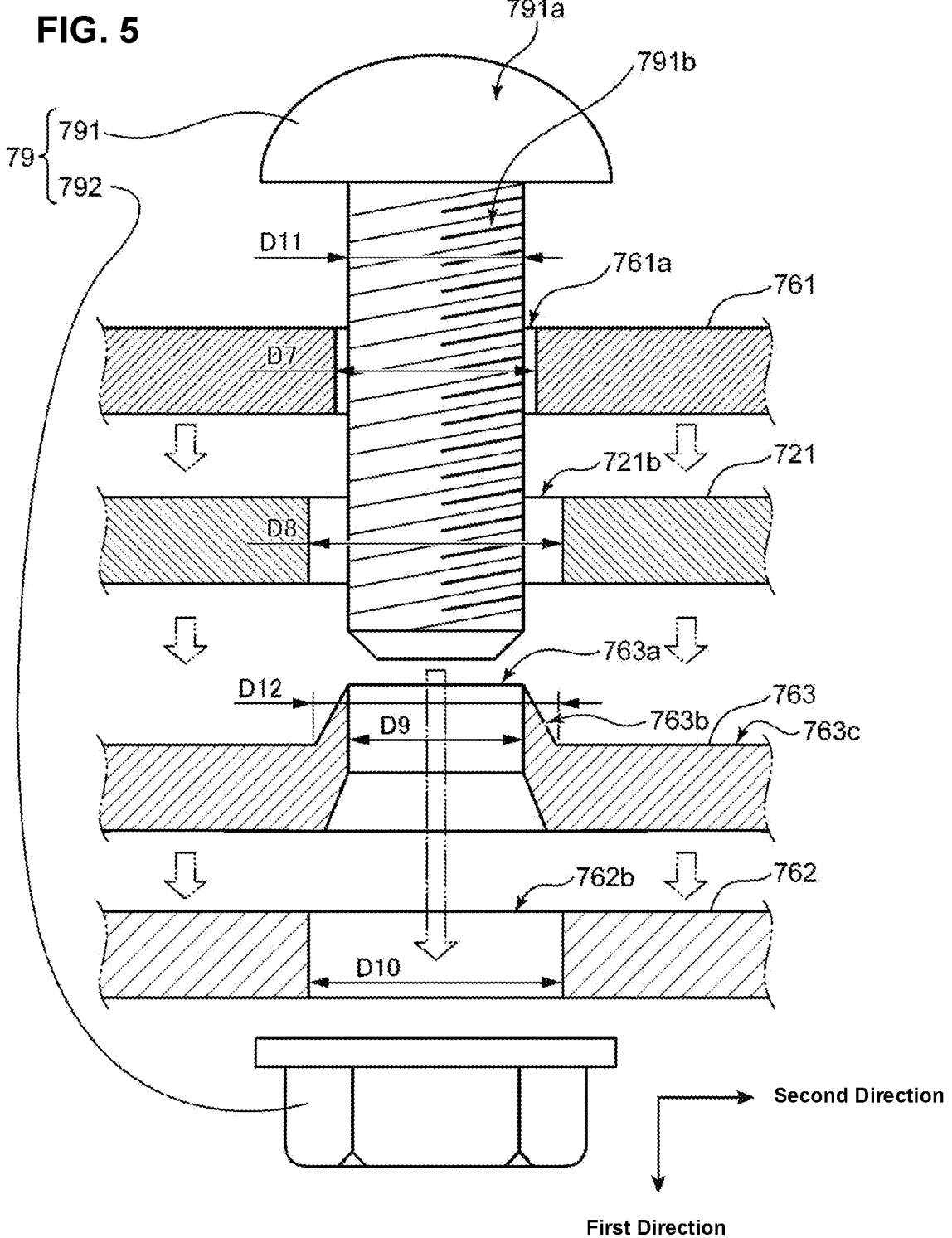
FIG. 5 is a sectional view showing the fastening structure of a portion shown by an arrow B2 in FIG. 3.

As shown in FIG. 5, at a position of the second fastening portion B2, three members of the outside fixing member 761, the outer member 721, the patch member 763, and the inside fixing member 762 overlap each other in the thickness direction and fastened together by a fastening member 79. At the second fastening portion B2, the overlapping direction of these members 761, 721, 763, 762 is referred to as the "first direction," and the direction crossing this first direction is referred to as the "second direction" as well.

The fastening member 79 includes a bolt 791 and a nut 792. Differently from the above-described first fastening structure B1, the bolt 791 does not comprise any conical middle portion, but is integrally formed by a head portion 791*a* and a shaft portion 791*b*. The head portion 791*a* of the bolt 791 has an outer diameter which is larger than an inner diameter of the through hole 761*a* of the outside fixing member 761. The shaft portion 791*c* is provided with a male screw at its peripheral face, and has an outer diameter D11 which is smaller than respective inner diameters D7-D10 of the through hole 761*a* of the outside fixing member 761, the trough hole 721*b* of the outer member 721, the through hole 763*a* of the patch member 763, and the through hole 762*b* of the inside fixing member 762. The bolt 791 is configured such that only the shaft portion 791*b* is inserted into the through holes 761*a*, 721*b*, 763*b*, 762*b* of the members 761, 721, 763, 762.

The patch member 763 comprises a flat portion 763*c* and a conical protrusion portion 763*b*. This flat portion 763*c* is configured to be flat in an area which surrounds the through hole 763*a* with a specified outward distance, in the second direction, away from the through hole 763*a* and to contact a main face of the inner member 721 with no gap between them when it overlaps with the outer member 721. The conical protrusion portion 763*b* is configured to protrude toward the through hole 721*b* of the outer member 721 in an area between the flat portion 763*c* and the through hole 763*a* of the patch member 763. The conical protrusion portion 763*b* is formed in a truncated cone shape such that the diameter of its lateral cross section (the outer diameter in the second direction) decreases gradually toward an edge portion of the through hole 763*a* from a border portion with the flat portion 763*c*. Herein, the maxim diameter D12 of the conical protrusion portion 763*b* is set to be equal to or smaller than the inner diameter D8 of the through hole 721*b* of the outer member 721. Thereby, when the patch member 763 overlaps with the outer member 721, the conical protrusion portion 763b is inserted toward an inside of the through hole 721b of the outer member 721, and the flat portion 763c contacts the main face of the outer member 721 with no gap between them.

The nut 792 is screwed with a tip portion of the shaft portion 791b of the bolt 791 which protrudes toward a back-face side of the inside fixing member 762.

5. Compression Mechanism of Outer Member 721 by Bolt 781

In the present embodiment, in a case where the outer member 721 and the bolt 781 of the fastening member 78 are offset from each other in the second direction, a portion of a periphery of the through hole 721a of the outer member 721 is compressed in the first direction. This mechanism will be described referring to FIGS. 6A-6D.

As shown in FIGS. 6A and 6B, in a case where the bolt 781 of the fastening member 78 is not offset from the outer member 721 in the second direction, the conical middle portion 781b of the bolt 781 is positioned inside the through hole 721a.

Meanwhile, as shown in FIGS. 6C and 6D, in a case where the bolt 781 of the fastening member 78 is offset from the outer member 721 in the second direction as shown by an arrow C1 and the conical middle portion 781b partially contacts the edge portion of the through hole 721a of the outer member 721, a contacted portion 721c of the outer member 721 receives a compressive force from an outer peripheral face of the conical middle portion 781b. Accordingly, the contacted portion 721c of the outer member 721 is compressed in the first direction as shown by an arrow C2. That is, the contacted portion 721c becomes a compressed portion.

Herein, since the fibers of the outer member 721 are arranged in the second direction, the fiber density at the contacted portion 721c becomes high, so that the strength of the outer member 721 against a pressing force caused by the bolt 781 being offset is improved.

6. Compression Mechanism of Inner Member 722 by Inside Fixing Member 762

In the present embodiment, in a case where the inside fixing member 762 and the inner member 722 are offset from each other in the second direction, a portion of a periphery of the through hole 722a of the inner member 722 is compressed in the first direction. This mechanism will be described referring to FIGS. 7A and 7B.

Figure 7A:
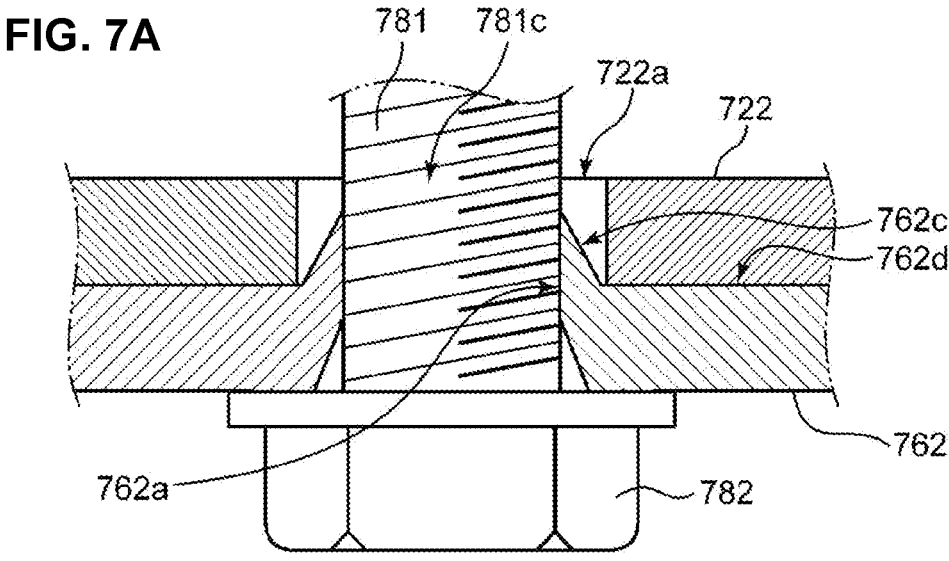
FIG. 7A is a sectional view showing a state where a conical protrusion portion of an inside fixing member is not offset, in a radial direction, from a through hole of an inner member.

As shown in FIG. 7A, in a case where the inside fixing member 762 is not offset from the inner member 722 in the second direction, the conical protrusion portion 762c of the inside fixing member 762 is positioned inside the through hole 722a.

Figure 7B:
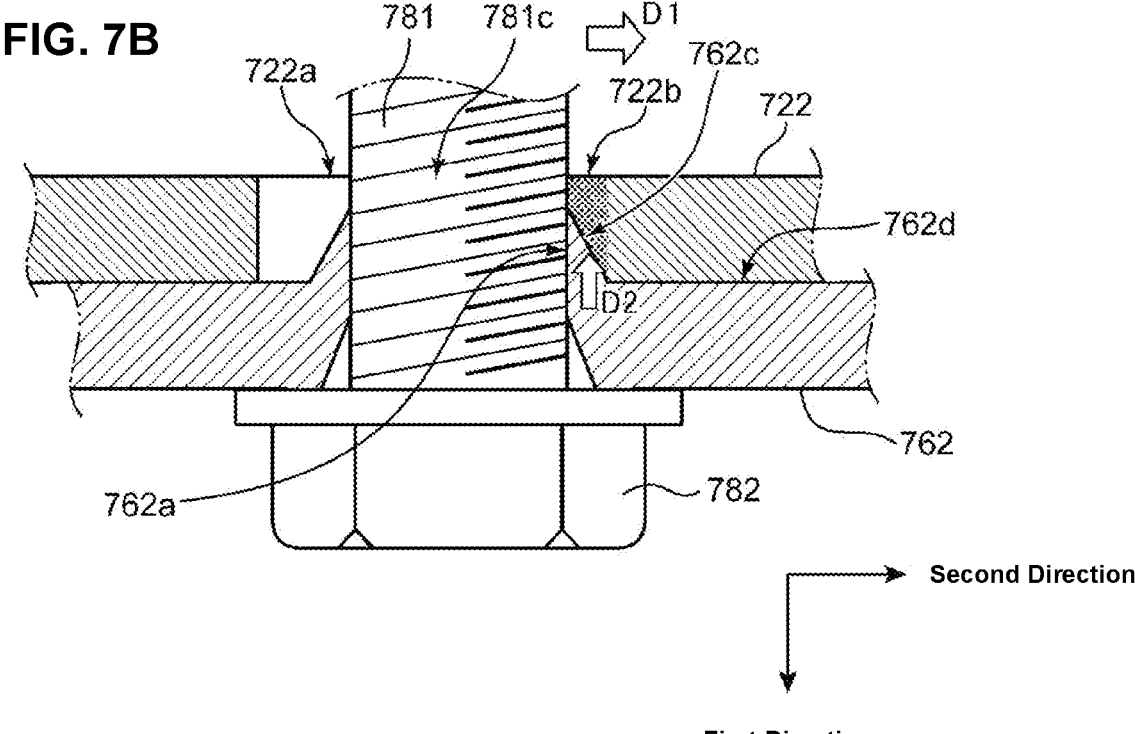
FIG. 7B is a sectional view showing a state where the conical protrusion portion of the inside fixing member is offset, in the radial direction, from the through hole of the inner member.

Meanwhile, as shown in FIG. 7B, in a case where the inside fixing member 762 is offset from the inner member 722 in the second direction together with the fastening member 78 as shown by an arrow D1 and the conical protrusion portion 762c partially contacts an edge portion of the through hole 722a of the inner member 721, a contacted portion 722b of the inner member 722 receives a compressive force from an outer peripheral face of the conical protrusion portion 762c. Accordingly, the contacted portion 722b of the inner member 722 is compressed in the first direction as shown by an arrow D2. That is, the contacted portion 722b becomes a compressed portion.

Herein, since the fibers of the inner member 722 are arranged in the second direction, the fiber density at the contacted portion 722b becomes high, so that the strength of the inner member 722 against a pressing force caused by the bolt 781 of the fastening member 78 and the inside fixing member 762 being offset is improved.

Herein, at the second fastening portion B2 shown in FIG. 5 as well, in a case where the patch portion 763 is offset from the outer member 721, a portion of the outer member 721 (a portion of a periphery of the through hole 721b) is compressed by the patch member 763. This mechanism is the same as the above-described one as well.

7. Effects

According to the fastening structure of the fiber reinforced resin-made member 721 of the present embodiment, since the fastening member 78 comprises the compression portion (the conical middle portion 781b of the bolt 781), in the case where the fastening member 78 is offset from the outer member 721 as the fiber reinforced resin-made member (in the second direction) and the conical middle portion 781b of the bolt 781 partially contacts the edge portion of the through hole 721a of the outer member 721, the contacted portion 721c of the outer member 721 is compressed in the first direction. Since the fibers of the outer member 721 are arranged in the second direction crossing the first direction, the buckling of the fibers at a compressed point where the contacted portion 721c is compressed in the first direction can be suppressed, so that the compression strength, in a direction of fiber's length, of the outer member 721 can be utilized efficiently. Thereby, the fiber's density at the compressed point so increases that the strength of the contacted portion 721c of the outer member 721 against a force applied in the second direction can be improved.

Accordingly, the fastening structure of the fiber reinforced resin-made member 721 of the present embodiment can properly suppress the buckling of the outer member 721 in the case where the fastening member 78 is offset from the outer member 721, without applying the collars proposed by the above-described patent document to the through hole of the outer member 721.

Further, according to the fastening structure of the fiber reinforced resin-made member 721 of the present embodiment, since the maximum diameter D5 of the conical middle portion 781b of the bolt 781 is set to be smaller than the inner diameter D2 of the through hole 721a of the outer member 721, in a case where the bolt 781 of the fastening member 78 is not offset from the outer member 721 (in the second direction), the outer member 721, the inner member 722 and the inside fixing member 762 can be fastened firmly without generating compressive deformation at the edge portion of the through hole 721a.

Meanwhile, in a case where the bolt 781 of the fastening member 78 is offset from the outer member 721 (in the second direction) and the conical middle portion 781b partially contacts the edge portion of the through hole 721a of the outer member 721, the contacted portion 721c of the outer member 721 is compressed in the first direction, so that the strength of the outer member 721 against a force applied from the bolt 781 of the fastening member 78 is improved.

Further, according to the fastening structures of the fiber reinforced resin-made members 721, 722 of the present embodiment, as described above referring to FIG. 4, the inside fixing member 762 as the other member comprises the conical protrusion portion 762c and this conical protrusion portion 762c serves as the second compression portion to compress the edge portion of the through hole 722a of the inner member 722. Thereby, in the case where the inside fixing member 762, in addition to the fastening member 78, is offset from the inner member 722 (in the second direction) and the conical protrusion portion 762c of the inside fixing member 762 partially contacts the edge portion of the through hole 722a of the inner member 722, the contacted portion 722b of the inner member 722 is compressed in the first direction when it receives a compressive force from the conical protrusion portion 762c as the compression portion. Accordingly, since the strength of the edge portion of the through holes 721a, 722a of the outer member 721 and the inner member 722 as the fiber reinforced resin-made member is improved by the above-described partial compressing of the conical middle portion 781b of the bolt 781 of the fastening member 78 against the outer member 721 and the above-described partial compressing of the conical protrusion portion 762c of the inside fixing member 762 against the inner member 722. Thereby, the buckling of the outer member 721 and the inner member 722 in the case of the above-described offset arrangement can be suppressed without applying the collars proposed by the above-described patent document.

Further, according to the fastening structure of the fiber reinforced resin-made members 721, 722 of the present embodiment, since the maximum diameter D6 of the conical protrusion portion 762c of the inside fixing member 762 is set to be smaller than the inner diameter D3 of the through hole 722a of the inner member 721, in a case where the inside fixing member 762 is not offset from the inner member 722 as the fiber reinforced resin-made member (in the second direction), the inner member 722 and the inside fixing member 762 are fastened firmly with no gap between them, without generating compressive deformation at the edge portion of the through hole 722a.

Meanwhile, in a case where the inside fixing member 762 is offset from the inner member 722 (in the second direction) and the conical protrusion portion 762c partially contacts the edge portion of the through hole 722a of the inner member 722, the contacted portion 722b of the inner member 722 is compressed in the first direction, so that the strength of the inner member 722 against a force applied from the fastening member 78 and so on is improved.

Further, according to the fastening structure of the fiber reinforced resin-made member 721 of the present embodiment, as shown in FIG. 5, since the patch member 763 comprises the conical protrusion portion 763b as the compression portion, in the case where the patch member 763 is offset from the outer member 721 as the fiber reinforced resin-made member together with the fastening member 79 (in the second direction) and the conical protrusion portion 763b of the patch member 763 partially contacts the edge portion of the through hole 721b of the outer member 721, the contacted portion of the outer member 721 is compressed in the first direction. Since the fibers of the outer member 721 are arranged in the second direction as described above, the fiber's density at the compressed point so increases that the strength against a force applied in the second direction is improved.

Accordingly, the fastening structure of the fiber reinforced resin-made member 721 of the present embodiment can properly suppress the buckling of the outer member 721 at the edge portion of the through hole 721b in the case where the patch member 763 is offset from the outer member 721 in the second direction, without applying the collars proposed by the above-described patent document.

Further, according to the fastening structure of the fiber reinforced resin-made member 721 of the present embodiment, since the maximum diameter D12 of the conical protrusion portion 763b of the patch member 763 is set to be smaller than the inner diameter D8 of the through hole 721b of the outer member 721, in a case where the patch member 763 is not offset from the outer member 721 (in the second direction), the outer member 721 and the patch member 763 are fastened firmly with no gap between them, without generating compressive deformation at the edge portion of the through hole 721b.

Meanwhile, in a case where the patch member 763 is offset from the outer member 721 (in the second direction) and the conical protrusion portion 763b partially contacts the edge portion of the through hole 721b of the outer member 721, the contacted portion of the outer member 721 is compressed in the first direction as described above, so that the strength of the outer member 721 against a force applied from the fastening member 79 and so on is improved.

As described above, the fastening structures of the fiber reinforced resin-made members 721, 722 of the present embodiment can properly suppress the bucking at the outer member 721 and the inner member 722, suppressing costs increasing, even in a case where the fastening member 78 and so on are offset from the outer member 721 and the inner member 722 in the second direction (the radial directions of the through holes 721a, 721b, 722a).

Modified Example 11

A fastening structure of a fiber reinforced resin-made member 80 according to a first modified example will be described referring to FIG. 8A.

Figures 8A, 8B:
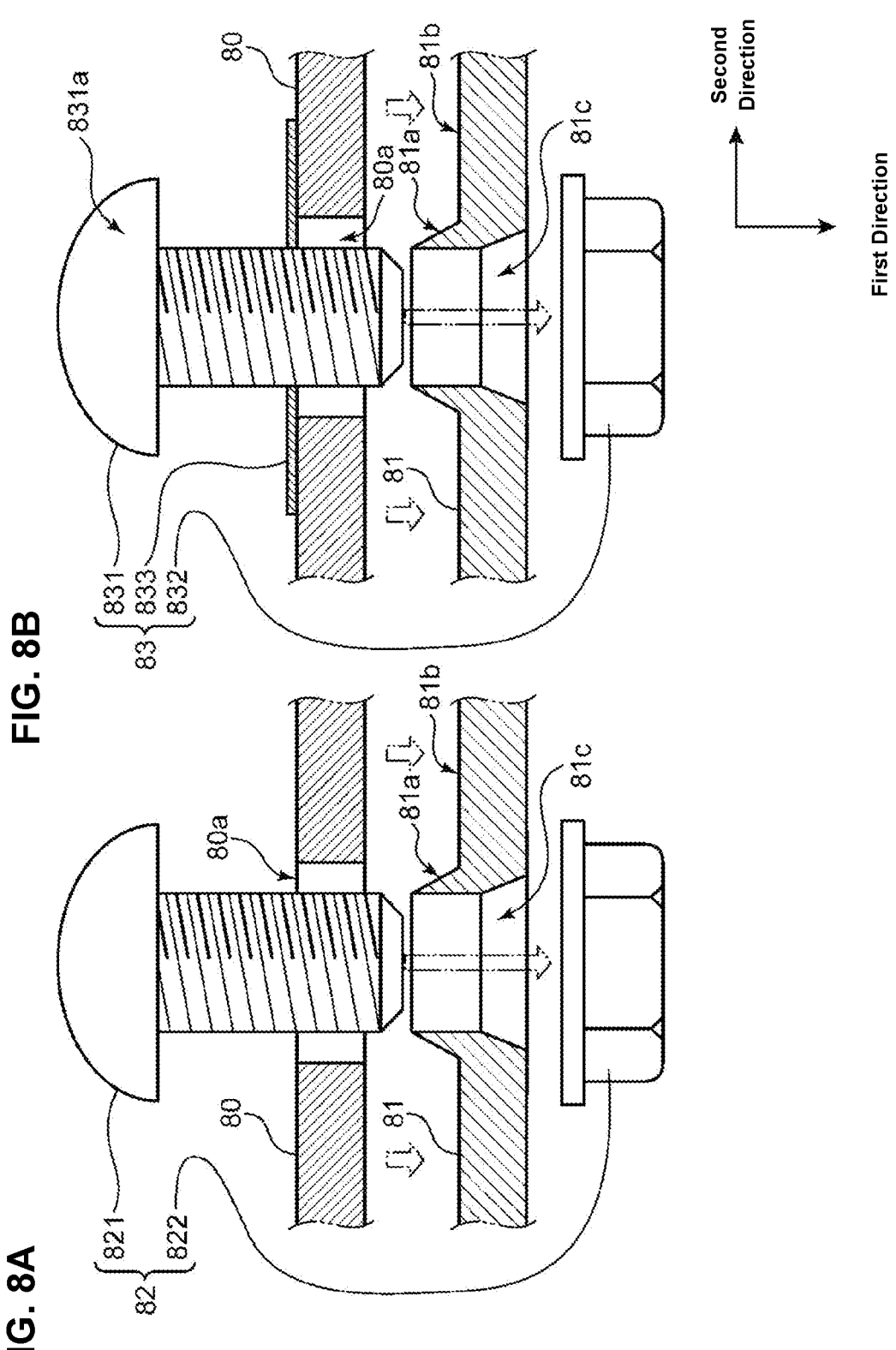
FIG. 8A is a sectional view showing a fastening structure of a fiber reinforced resin-made member according to a first modified example.
FIG. 8B is a sectional view showing a fastening structure of the fiber reinforced resin-made member according to a second modified example.

The fastening structure of the present modified example comprises the fiber reinforced resin-made member 80, a metal member 81, and a fastening member 82 as shown in FIG. 8A. The fiber reinforced resin-made member 80 and the metal member 81 overlap each other such that respective main faces of these members 80, 81 contact each other (in the first direction). Further, fibers of the fiber reinforced resin-made member 80 are arranged in the second direction crossing the first direction.

The fiber reinforced resin-made member 80 and the metal member 81 have through holes 80a, 81a where a shaft portion of a bolt 821 of the fastening member 82 is inserted, respectively. The fiber reinforced resin-made member 80 and the metal member 81 are joined together by the nut 822 screwed with the bolt 821 after the both overlap each other as shown in FIG. 8A.

In the fastening structure of the present modified example, the metal member 81 comprises a flat portion 81b which is configured to be flat in an area which surrounds the through hole 81c with a specified outward distance, in the second direction, away from the through hole 81c and to contact the main face of the fiber reinforced resin-made member 80 with no gap between them when it overlaps with the fiber reinforced resin-made member 80 and a conical protrusion portion 81a which is configured to protrude toward the through hole 80a of the fiber reinforced resin-made member 80 in an area between the flat portion 81b and the flat portion 81b.

The conical protrusion portion 81a is formed in the same shape as the conical protrusion portion 762c of the inside fixing member 762 and the conical protrusion portion 763b of the patch member 763 of the above-described embodiment. Further, the maxim diameter of the conical protrusion portion 81*a* relative to the through hole 80*a* is similar to those of the conical protrusion portion 762*c* of the inside fixing member 762 and the conical protrusion portion 763*b* of the patch member 763 of the above-described embodiment.

In the present modified example, the plate-shaped fiber reinforced resin-made member 80 and the plate-shaped metal member 81 are fastened together by the fastening member 82, and the conical protrusion portion 81*a* of the metal member 81 serves as the compression portion. That is, in the present modified example as well, in a case where the fiber reinforced resin-made member 80 and the metal member 81 are offset from each other in the second direction and the conical protrusion portion 81*a* partially contacts an edge portion of the through hole 80*a* of the fiber reinforced resin-made member 80, a contacted portion of the fiber reinforced resin-made member 80 receives compression in the first direction. Thereby, the present modified example can obtain the same effects as the above-described embodiment as well.

Modified Example 2

A fastening structure of a fiber reinforced resin-made member 80 according to a second modified example will be described referring to FIG. 8B.

The fastening structure of the present modified example is different from the above-described first modified example in constitution in which a fastening member 83 includes a washer 833 in addition to a bolt 831 and a nut 832. The others are the same as the first modified example.

In the present modified example, since the fastening member 83 includes the washer 833, it can be suppressed that a head portion 831*a* of the bolt 831 falls in the fiber reinforced resin-made member 80.

Modified Example 3

A fastening structure of a fiber reinforced resin-made member 80 according to a third modified example will be described referring to FIG. 9.

Figure 9:
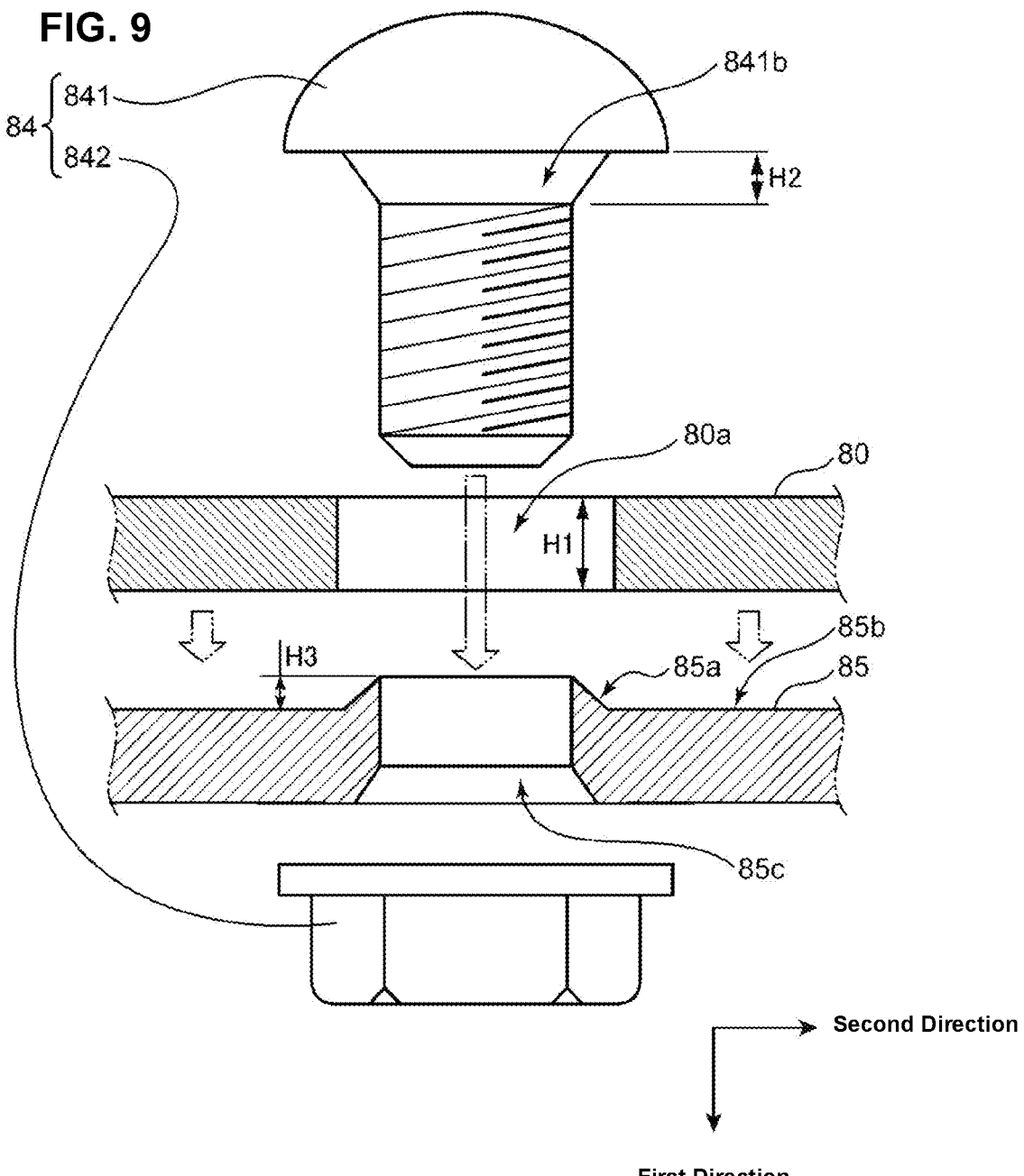
FIG. 9 is a sectional view showing a fastening structure of the fiber reinforced resin-made member according to a third modified example.

The fastening structure of the present modified example comprises the fiber reinforced resin-made member 80, a metal member 85, and a fastening member 84 as shown in FIG. 9. The fiber reinforced resin-made member 80 and the metal member 85 overlap each other such that respective main faces of these members 80, 85 contact each other (in the first direction). Further, fibers of the fiber reinforced resin-made member 80 are arranged in the second direction crossing the first direction.

The fiber reinforced resin-made member 80 and the metal member 85 have through holes 80*a*, 85*c* where a shaft portion of a bolt 841 of the fastening member 84 is inserted, respectively. The fiber reinforced resin-made member 80 and the metal member 85 are joined together by the nut 842 screwed with the bolt 841 after the both overlap each other as shown in FIG. 9.

In the fastening structure of the present modified example, similarly to the above-described first and second modified examples, the metal member 85 comprises a flat portion 85*b* in a surrounding area and a conical protrusion portion 85*a* protruding toward the through hole 80*a* of the fiber reinforced resin-made member 80 in an area between the flat portion 85*b* and the flat portion 85*b*.

The bolt 841 comprises a conical middle portion 841*b* similarly to the bolt 781 of the first fastening portion B1 of the above-described embodiment. The conical middle portion 841*b* of the bolt 841 is inserted toward an inside of the through hole 80*a* of the fiber reinforced resin-made member 80 when the nut 842 are screwed with the bolt 841.

Herein, the present modified example is configured such that the following relationship is satisfied in a case where a dimension, in the first direction, of the through hole 80*a* of the fiber reinforced resin-made member 80 is represented by H1, a dimension, in the first direction, of the conical middle portion 841*b* of the bolt 841 is represented by H2, and a protrusion dimension, in the first direction, of the conical protrusion portion 85*a* of the metal member 85 is represented by H3.

$$H1 \geq (H2 + H3) \qquad \text{(Equation 1)}$$

According to the above-described fastening structure of the fiber reinforced resin-made member 80 of the present modified example, since the bolt 841 comprises the conical middle portion 841*b* as the compression portion and the metal member 85 comprises the conical protrusion portion 85*a* as the second compression portion, in a case where the metal portion 85, in addition to the fastening member 84, is offset from the fiber reinforced resin-made member 80 (in the second direction) and the conical middle portion 841*b* of the bolt 841 and the conical protrusion portion 85*a* of the metal member 85 partially contact the edge portion of the through hole 80*a* of the fiber reinforced resin-made member, the contacted portion of the fiber reinforced resin-made member 80 is compressed in the first direction. Thereby, the strength of the edge portion of the through hole 80*a* of the fiber reinforced resin-made member 80 is improved by cooperation of the conical middle portion 841*b* (compression portion) of the bolt 841 of the fastening member 84 and the conical protrusion portion 85*a* (second compression portion) of the metal member 85, so that the buckling of the fiber reinforced resin-made member 80 in the case of the above-described offset arrangement can be suppressed without applying the collars proposed by the above-described patent document to the through hole.

Herein, respective relationships of the maximum diameter of the conical middle portion 841*b* of the bolt 841 and the maximum diameter of the conical protrusion portion 85*a* of the metal member 85 with the inner diameter of the through hole 80*a* of the fiber reinforced resin-made member 80 are the same as the above-described first and second modified examples. Thereby, the fastening structure of the fiber reinforced resin-made member 80 of the present modified example can obtain the same effects as the above-described embodiment and the first and second modified examples as well.

Modified Example 4

A fastening structure of a fiber reinforced resin-made member 80 according to a fourth modified example will be described referring to FIG. 10A. Herein, the following description mainly refers to constitution which is different from the fastening structure of the fiber reinforced resin-made member 80 of the above-described second modified example.

As shown in FIG. 10A, the fastening structure of the fiber reinforced resin-made member 80 of the present modified example comprises the fiber reinforced resin-made member 80, a metal member 87, and a fastening member 86. The metal member 87 does not have any conical protrusion portion around a through hole 87*a* but is configured to be flat.

The fastening member 86 includes a bolt 861, a nut 862, and a washer 863. The bolt 861 and the nut 862 do not have any conical middle portion or conical protrusion portion similarly to the bolt 831 and the nut 832 of the above-described second modified example.

The washer 863 which is inserted under a head portion of the bolt 861 comprises a flat portion 863b which is configured to be flat along a main face of the fiber reinforced resin-made member 80 in an area which surrounds a hole where a shaft portion of the bolt 861 is inserted with a specified outward distance, in a radial direction, away from this hole and a conical protrusion portion 863a which is configured to protrude toward the through hole 80a of the fiber reinforced resin-made member 80 in an area between the flat portion 863b and the above-described through hole.

According to the fastening structure of the fiber reinforced resin-made member 80 of the present modified example, the washer 863 of the fastening member 86 has the conical protrusion portion 863a, and this conical protrusion portion 863a serves as the compression portion similarly to the conical middle portion 781b of the bolt 781 of the first fastening portion B1 of the above-described embodiment. Thereby, in a case where the fastening member 86 is offset from the fiber reinforced resin-made member 80 (in the second direction) and the conical protrusion portion 863a of the washer 863 partially contacts the edge portion of the through hole 80a of the fiber reinforced resin-made member 80, a contacted portion of the fiber reinforced resin-made member 80 is compressed in the first direction. Thereby, the buckling of the fiber reinforced resin-made member 80 in the case of the above-described offset arrangement can be suppressed without applying the collars proposed by the above-described patent document to the through hole.

Herein, a relationship of the maximum diameter of the conical protrusion portion 863a of the washer 863 with the inner diameter of the through hole 80a of the fiber reinforced resin-made member 80 is the same as that of the maximum diameter D5 of the conical middle portion 781b of the bolt 781 with the inner diameter D2 of the through hole 721a of the above-described embodiment. Thereby, the fastening structure of the fiber reinforced resin-made member 80 of the present modified example can obtain the same effects as the above-described embodiment as well.

Modified Example 51

A fastening structure of a fiber reinforced resin-made member 80 according to a fifth modified example will be described referring to FIG. 10B. Herein, the following description mainly refers to constitution which is different from the fastening structure of the fiber reinforced resin-made member 80 of the above-described fourth modified example.

As shown in FIG. 10B, the fastening structure of the fiber reinforced resin-made member 80 of the present modified example is different from the fastening structure of the fiber reinforced resin-made member 80 of the above-described fourth modified example in a structure of the metal member 85. The metal member 85 is the same as the metal member 85 of the fastening structure of the fiber reinforced resin-made member 80 of the above-described third modified example. That is, the metal member 85 has the conical protrusion portion 85a protruding toward the through hole 80a of the fiber reinforced resin-made member 80 around the through hole 85c.

Herein, a total dimension of a protrusion dimension, in the first direction, of the conical protrusion portion 863a of the washer 863 and a protrusion dimension, in the first direction, of the conical protrusion portion 85a of the metal member 85 is set to be smaller than a dimension, in the first direction, of the through hole 80a of the fiber reinforced resin-made member 80.

According to the above-described fastening structure of the fiber reinforced resin-made member 80 of the present modified example, the washer 863 has the conical protrusion portion 863a as the compression portion and also the metal member 85 has the conical protrusion portion 85a as the second compression portion. Thereby, in a case where the metal member 85, in addition to the fastening member 86, is offset from the fiber reinforced resin-made member 80 (in the second direction) and the conical protrusion portion 863a of the washer 863 and the conical protrusion portion 85a of the metal member 85 partially contact the edge portion of the through hole 80a of the fiber reinforced resin-made member 80, respectively, respective contacted portions of the fiber reinforced resin-made member 80 are compressed in the first direction. Thereby, the strength of the edge portion of the through hole 80a of the fiber reinforced resin-made member 80 is improved by cooperation of the conical protrusion portion 863a (compression portion) of the washer 863 of the fastening member 86 and the conical protrusion portion 85a (second compression portion) of the metal member 85, so that the buckling of the fiber reinforced resin-made member 80 in the case of the above-described offset arrangement can be suppressed without applying the collars proposed by the above-described patent document to the through hole.

Herein, respective relationships of the maximum diameter of the conical protrusion portion 863a of the washer 863 and the maximum diameter of the conical protrusion portion 85a of the metal member 85 with the inner diameter of the through hole 80a of the fiber reinforced resin-made member 80 are the same as those of the above-described third and fourth modified examples. Thereby, the fastening structure of the fiber reinforced resin-made member 80 of the present modified example can obtain the same effects as the above-described third and fourth modified examples.

Modified Example 6

A fastening structure of a fiber reinforced resin-made member 80 according to a sixth modified example will be described referring to FIG. 11B.

Figures 11A, 11B:
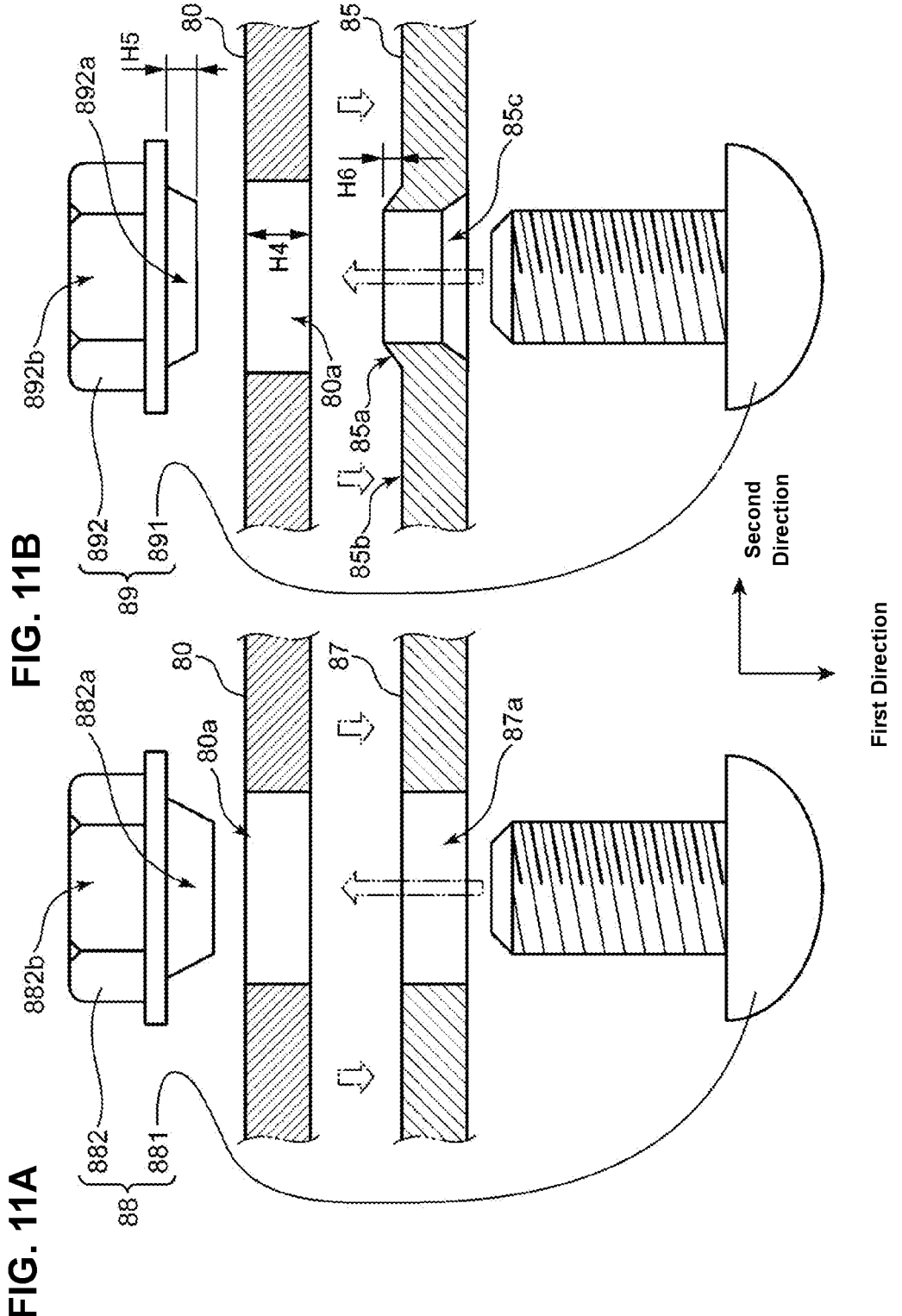
FIG. 11A is a sectional view showing a fastening structure of the fiber reinforced resin-made member according to a sixth modified example.
FIG. 11B is a sectional view showing a fastening structure of the fiber reinforced resin-made member according to a seventh modified example.

As shown in FIG. 11A, the fastening structure of the present modified example comprises the fiber reinforced resin-made member 80, the metal member 87, and a fastening member 88. The fiber reinforced resin-made member 80 and the metal member 87 overlap each other (in the first direction) such that the respective main faces of these contact each other. The fibers of the fiber reinforced resin-made member 80 are arranged in the second direction crossing the first direction similarly to the above-described first modified example. The metal member 87 does not have any conical protrusion portion around the through hole 87a similarly to the above-described fourth modified example.

In the present modified example, the fastening member 88 includes a bolt 881 and a nut 882. A head portion of the bolt 881 is provided on the side of the metal member 87, and a shaft portion is provided such that it is inserted into the through hole 80a of the fiber reinforced resin-made member 80 from the through hole 87a of the metal member 87. The nut 882 is arranged on an opposite side to the metal member 87 relative to the fiber reinforced resin-made member 80.

In the present modified example, the nut 882 has a conical protrusion portion 882a protruding toward the through hole 80a of the fiber reinforced resin-made member 80. The conical protrusion portion 882a is provided around a female-screw hole with which the shaft portion of the bolt 881 engages, and formed in the truncated cone shape such that the diameter of its lateral cross section decreases gradually toward an end portion from a side of a body portion 882b (a portion to engage with a wrench or the like) of the nut 882.

In the present modified example, a structure in which the plate-shaped fiber reinforced resin-made member 80 and the plate-shaped metal member 87 are fastened together by the fastening member 88 is provided, and the conical protrusion portion 882a of the nut 882 serves as the compression portion. That is, in the present modified example, in a case where the fiber reinforced resin-made member 80 and the fastening member 88 are offset from each other in the second direction and the conical protrusion portion 882a partially contacts the edge portion of the through hole 80a of the fiber reinforced resin-made member 80, a contacted portion of the fiber reinforced resin-made member 80 receives compression in the first direction. Thereby, the present modified example can obtain the same effects as the above-described embodiment as well.

Herein, the maximum diameter of the conical protrusion portion 882a of the nut 882 of the present modified example is set to be smaller than the inner diameter of the through hole 80a of the fiber reinforced resin-made member 80. Accordingly, in a case where the fastening member 88 is not offset from the fiber reinforced resin-made member 80 (in the second direction), the fiber reinforced resin-made member 80 and the metal member 87 can be fastened firmly, without generating compressive deformation at the edge portion of the through hole 80a.

Meanwhile, in a case where the fastening member 88 is offset from the fiber reinforced resin-made member 80 (in the second direction) and the conical protrusion portion 882a partially contacts the edge portion of the through hole 80a of the fiber reinforced resin-made member 80, the contacted portion of the fiber reinforced resin-made member 80 is compressed in the first direction (overlapping direction), so that the strength of the fiber reinforced resin-made member 80 against a force applied from the fastening member 88 is improved.

Modified Example 7

A fastening structure of a fiber reinforced resin-made member 80 according to a seventh modified example will be described referring to FIG. 11B.

As shown in FIG. 11B, the fastening structure of the present modified example comprises the fiber reinforced resin-made member 80, the metal member 85, and a fastening member 89. The fiber reinforced resin-made member 80 and the metal member 85 overlap each other (in the first direction) such that the respective main faces of these contact each other. The fibers of the fiber reinforced resin-made member 80 are arranged in the second direction crossing the first direction similarly to the above-described first modified example. Further, the metal member 85 has the conical protrusion portion 85a around the through hole 85c similarly to the above-described fifth modified example.

The fastening member 89 includes a bolt 891 and a nut 892. The bolt 891 does not have any conical middle portion similarly to the bolt 881 of the sixth modified example, its head portion is provided on the side of the metal member 85, and its shaft portion is provided to be inserted into the through hole 80a of the fiber reinforced resin-made member 80 from the through hole 85c of the metal member 85.

The nut 892 is arranged on an opposite side to the metal member 85 relative to the fiber reinforced resin-made member 80, and has a conical protrusion portion 892a protruding toward the through hole 80a of the fiber reinforced resin-made member 80. The conical protrusion portion 892a is, similarly to the nut 892 of the sixth modified example, provided around a female-screw hole with which the shaft portion of the bolt 891 engages, and formed in the truncated cone shape such that the diameter of its lateral cross section decreases gradually toward an end portion from a side of a body portion 892b (a portion to engage with the wrench or the like) of the nut 892.

Herein, the present modified example is configured such that the following relationship is satisfied in a case where a dimension, in the first direction, of the through hole 80a of the fiber reinforced resin-made member 80 is represented by H4, a dimension, in the first direction, of the conical protrusion portion 892a of the bolt 892 is represented by H5, and a protrusion dimension, in the first direction, of the conical protrusion portion 85a of the metal member 85 is represented by H6.

$$H4 \geq (H5 + H6) \tag{Equation 2}$$

According to the above-described fastening structure of the fiber reinforced resin-made member 80 of the present modified example, the washer 892 has the conical protrusion portion 892a as the compression portion and also the metal member 85 has the conical protrusion portion 85a as the second compression portion. Thereby, in a case where the metal member 85, in addition to the fastening member 89, is offset from the fiber reinforced resin-made member 80 (in the second direction) and the conical protrusion portion 892a of the nut 892 and the conical protrusion portion 85a of the metal member 85 partially contact the edge portion of the through hole 80a of the fiber reinforced resin-made member 80, respectively, respective contacted portions of the fiber reinforced resin-made member 80 are compressed in the first direction. Thereby, the strength of the edge portion of the through hole 80a of the fiber reinforced resin-made member 80 is improved by cooperation of the conical protrusion portion 892a (compression portion) of the nut 892 of the fastening member 89 and the conical protrusion portion 85a (second compression portion) of the metal member 85, so that the buckling of the fiber reinforced resin-made member 80 in the case of the above-described offset arrangement can be suppressed without applying the collars proposed by the above-described patent document to the through hole.

Herein, respective relationships of the maximum diameter of the conical protrusion portion 892a of the nut 892 and the maximum diameter of the conical protrusion portion 85a of the metal member 85 with the inner diameter of the through hole 80a of the fiber reinforced resin-made member 80 are the same as those of the above-described third and sixth modified examples. Thereby, the fastening structure of the fiber reinforced resin-made member 80 of the present modified example can obtain the same effects as the above-described third and sixth modified examples.

Modified Example 8

A fastening structure of fiber reinforced resin-made members 100, 101 according to a eighth modified example will be described referring to FIG. 12A.

Figures 12A, 12B:
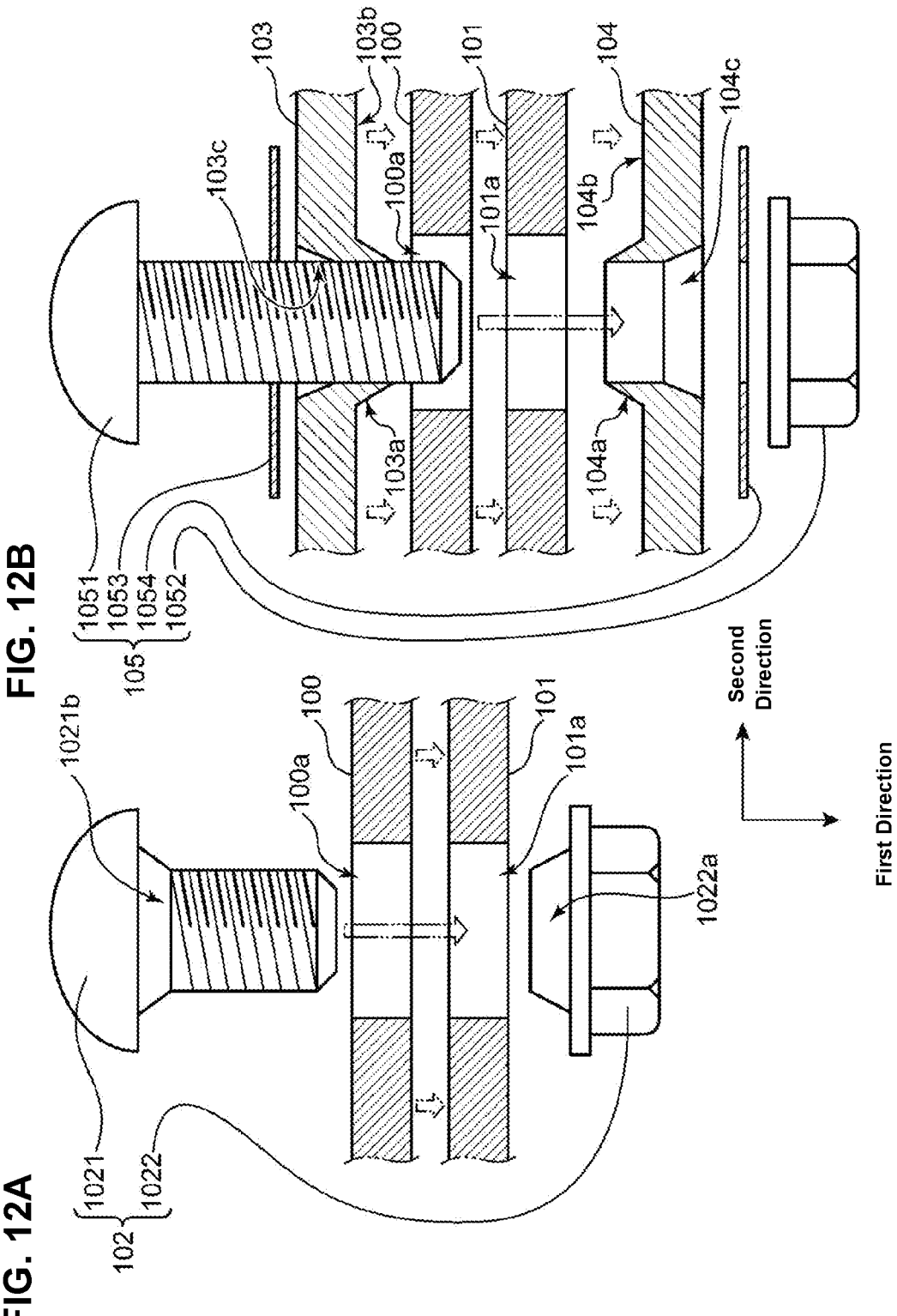
FIG. 12A is a sectional view showing a fastening structure of the fiber reinforced resin-made member according to an eighth modified example.
FIG. 12B is a sectional view showing a fastening structure of the fiber reinforced resin-made member according to a nineth modified example.

As shown in FIG. 12A, the fastening structure of the present modified example comprises the fiber reinforced resin-made member 100, the fiber reinforced resin-made member 101, and a fastening member 102. The fiber reinforced resin-made member 100 and the fiber reinforced resin-made member 101 overlap each other (in the first direction) such that the respective main faces of these contact each other. The respective fibers of the fiber reinforced resin-made member 100 and the fiber reinforced resin-made member 101 are arranged in the second direction crossing the first direction.

The fiber reinforced resin-made member 100 and the fiber reinforced resin-made member 101 have through holes 100a, 101a where a shaft portion of a bolt 1021 of the fastening member 102 is inserted, respectively. The fiber reinforced resin-made member 100 and the fiber reinforced resin-made member 101 overlap each other as shown in FIG. 12A and then joined together by screwing a nut 1022 with the bolt 1021.

In the fastening structure of the present modified example, the bolt 1021 of the fastening member 102 comprises a conical middle portion 1021b similarly to the bolt 781 of the first fastening portion B1 of the above-described embodiment. Further, the nut 1022 of the fastening member 102 comprises a conical protrusion portion 1022a similarly to the nut 882 of the above-described sixth modified example.

In the present modified example, in a case where the fiber reinforced resin-made member 100 and the fiber reinforced resin-made member 101 are fastened by the fastening member 102, the conical middle portion 1021b of the bolt 1021 of the fastening member 102 serves as the compression portion to compress an edge portion of the through hole 100a of the fiber reinforced resin-made member 100 in the first direction. Further, the conical protrusion portion 1022a of the nut 1022 of the fastening member 102 serves as the compression portion to compress an edge portion of the through hole 101a of the fiber reinforced resin-made member 101 in the first direction. That is, in the present modified example, in a case where the fastening member 102 is offset from the fiber reinforced resin-made member 100 and the fiber reinforced resin-made member 101 in the second direction and thereby the conical middle portion 1021b of the bolt 1021 partially contacts the edge portion of the through hole 100a of the fiber reinforced resin-made member 100 and the conical protrusion portion 1022a of the nut 1022 contacts the edge portion of the through hole 101a of the fiber reinforced resin-made member 101, respective contacted portions of the fiber reinforced resin-made member 100 and the fiber reinforced resin-made member 101 receive compression in the first direction. Thereby, the present modified example can obtain the same effects as the above-described embodiment and others as well.

Herein, a relationship of the maximum diameter of the conical middle portion 1021b of the bolt 1021 with an inner diameter of the through hole 100a of the fiber reinforced resin-made member 100 and a relationship of the maximum diameter of the conical protrusion portion 1022a of the nut 1022 with an inner diameter of the through hole 101a of the fiber reinforced resin-made member 101 are the same as those of the above-described embodiment, sixth modified example, and others. Thereby, the fastening structure of the fiber reinforced resin-made member 100 and the fiber reinforced resin-made member 101 can obtain the same effects as the above-described embodiment and sixth modified example as well.

Modified Example 9

A fastening structure of the fiber reinforced resin-made members 100, 101 according to a nineth modified example will be described referring to FIG. 12B. Herein, the following description mainly refers to constitution which is different from the above-described eighth modified example.

As shown in FIG. 12B, the fastening structure of the fiber reinforced resin-made members 100, 101 of the present modified example comprises metal members 103, 104, the fiber reinforced resin-made members 100, 101, and a fastening member 105. In these members, the structure of the fiber reinforced resin-made members 100, 101 is the same as the eighth modified example.

The metal member 103 comprises a flat portion 103b and a conical protrusion portion 103a similarly to the patch member 763 of the second fastening portion B2 of the above-described embodiment. The conical protrusion portion 103a is formed in the truncated cone shape toward the trough hole 100a of the fiber reinforced resin-made member 100.

The metal member 104 comprises a flat portion 104b and a conical protrusion portion 104a similarly to the patch member 763 of the second fastening portion B2 of the above-described embodiment as well. The conical protrusion portion 104a is formed in the truncated cone shape toward the trough hole 101a of the fiber reinforced resin-made member 101.

Herein, respective inner diameters of the metal members 103, 104 of the present modified examples are configured to be smaller than those of the through holes 1001, 101a of the fiber reinforced resin-made members 100, 101.

The fastening member 105 includes a bolt 1051, a nut 1052, and washers 1053, 1054. The bolt 1051 does not have any conical middle portion, and the nut 1052 does not any conical protrusion portion. The washers 1053, 1054 do not have any conical protrusion portion, either.

In the present modified example, in a case where the metal members 103, 104 and the fiber reinforced resin-made members 100, 101 are fastened by the fastening member 105, the conical protrusion portion 103a of the metal member 103 serves as the compression portion to compress the edge portion of the through hole 100a of the fiber reinforced resin-made member 100 in the first direction. Further, the conical protrusion portion 104a of the metal member 104 serves as the compression portion to compress the edge portion of the through hole 101a of the fiber reinforced resin-made member 101 in the first direction. That is, in the present modified example, in a case where the metal members 103, 104, in addition to the fastening member 105, are offset from the fiber reinforced resin-made member 100 and the fiber reinforced resin-made member 101 in the second direction and thereby the conical protrusion portion 103a of the metal member 103 partially contacts the edge portion of the through hole 100a of the fiber reinforced resin-made member 100 and the conical protrusion portion 104a of the metal member 104 contacts the edge portion of the through hole 101a of the fiber reinforced resin-made member 101, respective contacted portions of the fiber reinforced resin-made member 100 and the fiber reinforced resin-made member 101 receive compression in the first direction. Thereby, the present modified example can obtain the same effects as the above-described eighth modified example as well.

Herein, a relationship of the maximum diameter of the conical protrusion portion 103a of the metal member 103 with the inner diameter of the through hole 100a of the fiber reinforced resin-made member 100 and a relationship of the maximum diameter of the conical protrusion portion 104a of the metal member 104 with the inner diameter of the through hole 101a of the fiber reinforced resin-made member 101 are the same as those of the above-described embodiment and others. Thereby, the fastening structure of the fiber reinforced resin-made members 100, 101 of the present modified example can obtain the same effects as the above-described embodiment and others as well.

Modified Example 10

A fastening structure of the fiber reinforced resin-made members 100, 101 according to a tenth modified example will be described referring to FIG. 13.

Figure 13:
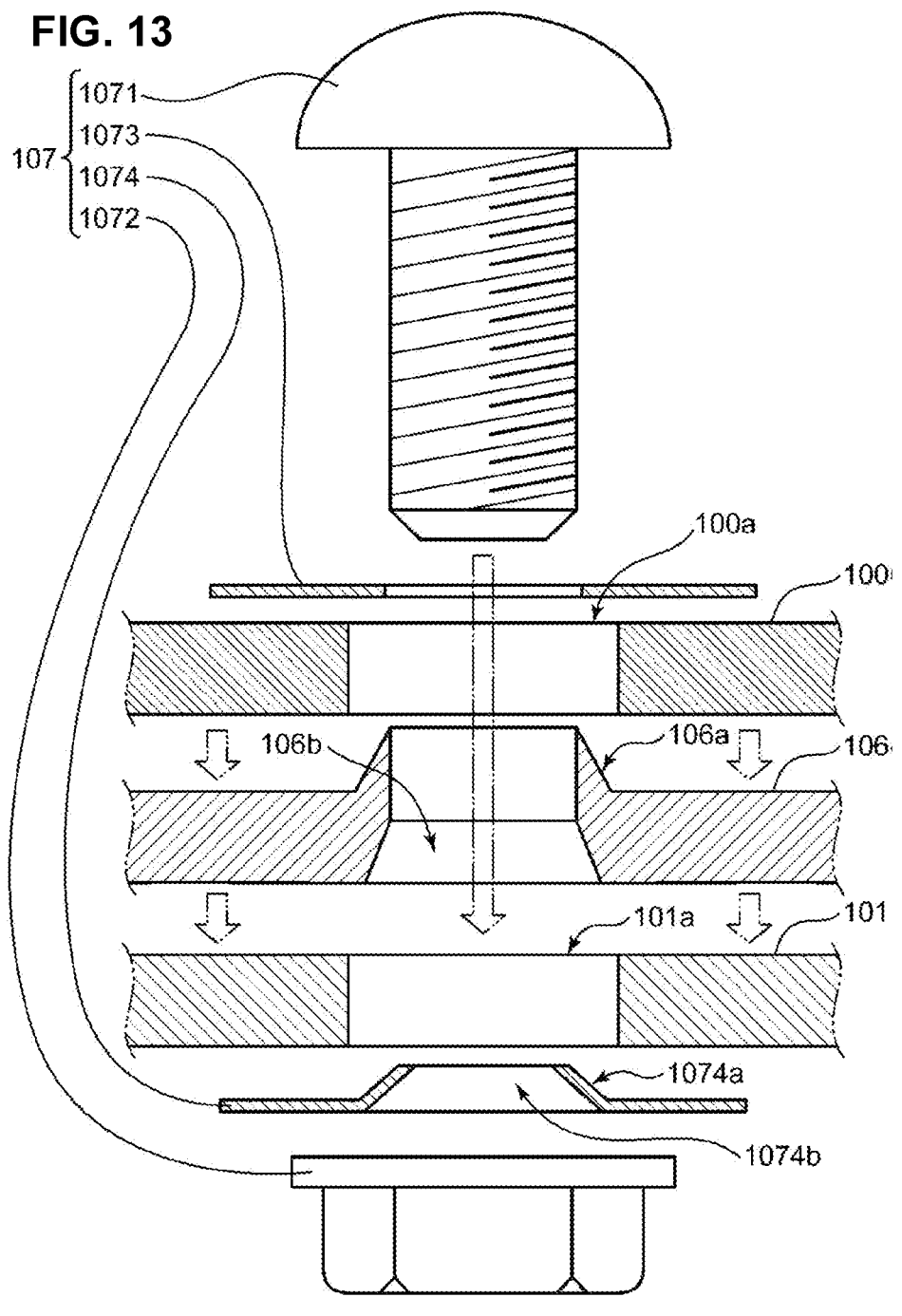
FIG. 13 is a sectional view showing a fastening structure of the fiber reinforced resin-made member according to a tenth modified example.
Figure 14A:
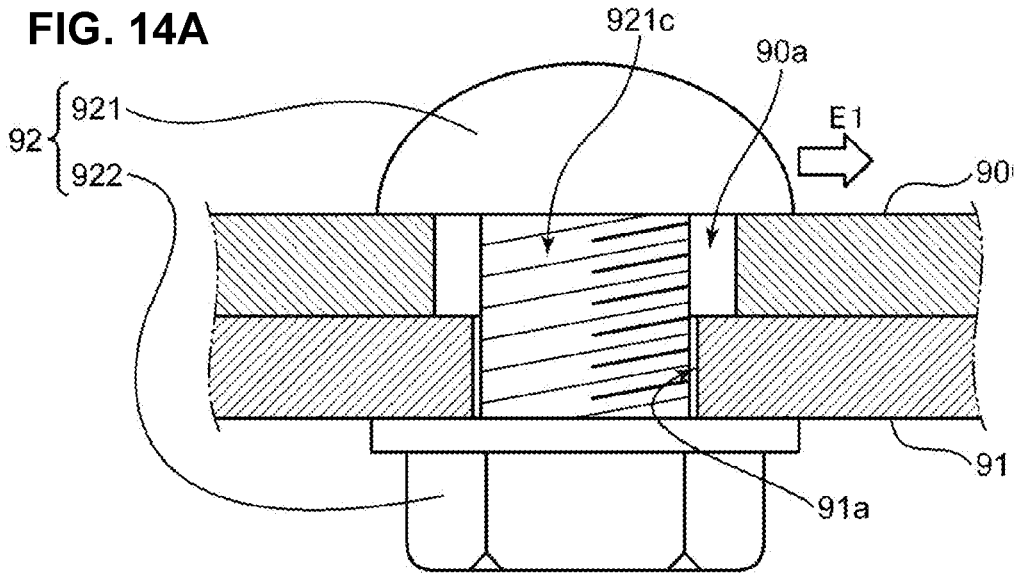
FIG. 14A is a sectional view showing a fastening structure of a fiber reinforced resin-made member according to prior art.
Figure 14B:
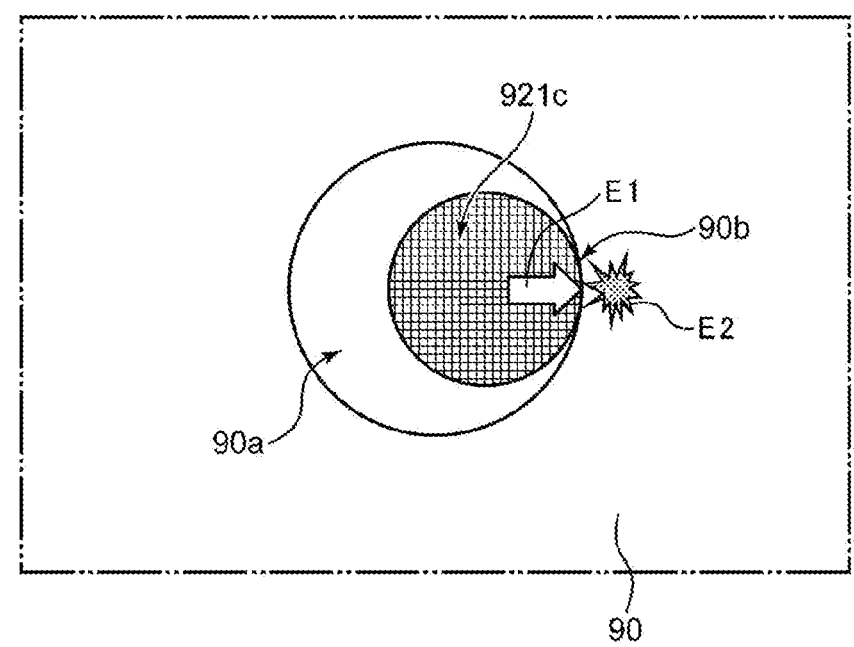
FIG. 14B is a plan view showing the fastening structure of the fiber reinforced resin-made member according to the prior art.

As shown in FIG. 13, the fastening structure of the fiber reinforced resin-made members 100, 101 of the present modified example comprises metal a member 106, the fiber reinforced resin-made members 100, 101, and a fastening member 107. In these members, the structure of the fiber reinforced resin-made members 100, 101 is the same as the eighth and ninth modified examples.

The metal member 106 comprises a flat portion 106*b* and a conical protrusion portion 106*a* similarly to the patch member 763 of the second fastening portion B2 of the above-described embodiment. The conical protrusion portion 106*a* is formed in the truncated cone shape toward the trough hole 100*a* of the fiber reinforced resin-made member 100.

Herein, in the present modified example, the metal member 106 is arranged between the fiber reinforced resin-made members 100, 101. An inner diameter of the through hole 106*b* of the metal member 106 is configured to be smaller than those of the through holes 100*a*, 101*a* of the fiber reinforced resin-made members 100, 101.

The fastening member 107 includes a bolt 1071, a nut 1072, and washers 1073, 1074. The bolt 1071 does not have any conical middle portion, and the nut 1072 does not any conical protrusion portion. While the washer 1073 does not have any conical protrusion portion, the washer 1074 has a conical protrusion portion 1074*a* around a through hole 1074*b*, which is formed in the truncated cone shape toward the trough hole 101*a* of the fiber reinforced resin-made member 101.

Herein, in the present modified example, an inner diameter of the through hole 1074*b* of the washer 1074 is configured to be smaller than those of the through holes 100*a*, 101*a* of the fiber reinforced resin-made members 100, 101.

In the present modified example, in a case where the metal member 106 and the fiber reinforced resin-made members 100, 101 are fastened by the fastening member 107, the conical protrusion portion 106*a* of the metal member 106 serves as the compression portion to compress the edge portion of the through hole 100*a* of the fiber reinforced resin-made member 100 in the first direction. Further, the conical protrusion portion 1074*a* of the washer 1074 of the fastening member 107 serves as the compression portion to compress the edge portion of the through hole 101*a* of the fiber reinforced resin-made member 101 in the first direction. That is, in the present modified example, in a case where the metal member 106, in addition to the fastening member 107, is offset from the fiber reinforced resin-made member 100 and the fiber reinforced resin-made member 101 in the second direction and thereby the conical protrusion portion 106*a* of the metal member 106 partially contacts the edge portion of the through hole 100*a* of the fiber reinforced resin-made member 100 and the conical protrusion portion 1074*a* of the washer 1074 contacts the edge portion of the through hole 101*a* of the fiber reinforced resin-made member 101, respective contacted portions of the fiber reinforced resin-made member 100 and the fiber reinforced resin-made member 101 receive compression in the first direction. Thereby, the present modified example can obtain the same effects as the above-described eighth and nineth modified examples and others as well.

Herein, a relationship of the maximum diameter of the conical protrusion portion 106*a* of the metal member 106 with the inner diameter of the through hole 100*a* of the fiber reinforced resin-made member 100 and a relationship of the maximum diameter of the conical protrusion portion 1074*a* of the washer 1074 with the inner diameter of the through hole 101*a* of the fiber reinforced resin-made member 101 are the same as those of the above-described embodiment and others. Thereby, the fastening structure of the fiber reinforced resin-made members 100, 101 of the present modified example can obtain the same effects as the above-described embodiment and others as well.

Other Modified Examples

While the fastening structure of the fiber reinforced resin-made member according to the present invention is applied to the strut tower bar 7 included in the front structure of the vehicle 1 in the above-described embodiments and others, the present invention is applicable to any other member of the vehicle (a reinforcing member provided below the floor panel or the like), any other structural object than the vehicle (a ship or aircraft or an industrial machine), or the like.

Further, while the fastening members 78, 79 including the bolts 781, 791 and the nuts 782, 792 are adopted in the above-described embodiment and others, the present invention is not limited to this. For example, a female screw is formed at a contact plate member or the like of the inside fixing member 762 of the first fastening portion B1, and a bolt can be screwed with this female screw. Further, a rivet or the like are applicable as the fastening member.

While the fastening structure of the fiber reinforced resin-made members 100, 101, 721, 722 are configured such that their fibers are arranged in the second direction (the direction crossing the first direction as the overlapping direction), this fiber's direction may be a single direction or plural directions which cross each other.

Various types of fiber reinforced resin-made member are applicable as the fastening structure of the fiber reinforced resin-made members 100, 101, 721, 722, which is not referred in the above-described embodiment and first—tenth modified examples. For example, GFRP, FRP or the like are applicable.

Moreover, while the metal members 81, 85, 103, 104, 762, 763 are adopted as the other member in the above-described embodiment and first—tenth modified examples, the present invention is not limited to this. Any resin material is applicable as long as it has the higher strength than the fiber reinforced resin-made member.

What is claimed is:

1. A fastening structure of a fiber reinforced resin-made member, comprising:
    a fiber reinforced resin-made member;
    another member overlapping with the fiber reinforced resin-made member; and
    a fastening member fastening the fiber reinforced resin-made member and the other member,
    wherein said fiber reinforced resin-made member has a through hole penetrating in a first direction which corresponds to a direction of said overlapping and contains fibers which are arranged in a direction crossing said first direction, said other member has a hole portion which is continuous to the through hole of said fiber reinforced resin-made member, said fastening member is inserted into the through hole of said fiber reinforced resin-made member and the hole portion of said other member so as to fasten the fiber reinforced resin-made member and the other member, and the fastening member comprises a compression portion which is configured to partially contact an edge portion of the through hole of said fiber reinforced resin-made member in a case where the fastening member is offset from the fiber reinforced resin-made member and compress a contacted portion of said fiber reinforced resin-made member in said first direction.

2. The fastening structure of the fiber reinforced resin-made member of claim 1, wherein said fastening member comprises a head portion with a diameter larger than the through hole of said fiber reinforced resin-made member, a shaft portion extending in an opposite direction to said head portion, and a conical middle portion provided continuously between said head portion and said shaft portion and being configured such that a diameter of a lateral cross section thereof decreases gradually from the head portion toward the shaft portion, said fastening member is arranged such that said head portion is positioned on an opposite side to said other member relative to said fiber reinforced resin-made member and said conical middle portion is positioned inside the through hole of the fiber reinforced resin-made member, and said compression portion of the fastening member is configured to be said conical middle portion.

3. The fastening structure of the fiber reinforced resin-made member of claim 2, wherein said other member comprises a flat portion and a second conical protrusion portion, the flat portion being configured to be flat in an area which surrounds the hole portion thereof with a specified outward distance, in a radial direction, away from an edge of the hole portion thereof and to contact a main face of said fiber reinforced resin-made member, the second conical protrusion portion being configured to protrude from said flat portion in one direction in an area between the flat portion and the edge of the hole portion of the other member such that a diameter of a lateral cross section thereof decreases gradually toward said edge of the hole portion from the flat portion and to be positioned inside the through hole of said fiber reinforced resin-made member, and said second conical protrusion portion of the other member is a second compression portion which is different from the compression portion of said fastening member and configured to partially contact said edge portion of the through hole of the fiber reinforced resin-made member in a case where said fiber reinforced resin-made member and said other member are offset from each other in the radial direction and compress a contacted portion of the fiber reinforced resin-made member in said first direction.

4. The fastening structure of the fiber reinforced resin-made member of claim 1, wherein said fastening member includes a bolt and a nut, said nut comprises a body portion with a diameter larger than the through hole of said fiber reinforced resin-made member and a conical protrusion portion continuously protruding from said body portion in one direction such that a diameter of a lateral cross section thereof decreases gradually toward a direction away from the body portion, the nut is arranged such that said body portion is positioned on an opposite side to said other member relative to said fiber reinforced resin-made member and said conical protrusion portion is positioned inside the through hole of the fiber reinforced resin-made member, and said compression portion of the fastening member is configured to be said conical protrusion portion of the nut.

5. The fastening structure of the fiber reinforced resin-made member of claim 4, wherein said other member comprises a flat portion and a second conical protrusion portion, the flat portion being configured to be flat in an area which surrounds the hole portion thereof with a specified outward distance, in a radial direction, away from an edge of the hole portion thereof and to contact a main face of said fiber reinforced resin-made member, the second conical protrusion portion being configured to protrude from said flat portion in one direction in an area between the flat portion and the edge of the hole portion of the other member such that a diameter of a lateral cross section thereof decreases gradually toward said edge of the hole portion from the flat portion and to be positioned inside the through hole of said fiber reinforced resin-made member, and said second conical protrusion portion of the other member is a second compression portion which is different from the compression portion of said fastening member and configured to partially contact said edge portion of the through hole of the fiber reinforced resin-made member in a case where said fiber reinforced resin-made member and said other member are offset from each other in the radial direction and compress a contacted portion of the fiber reinforced resin-made member in said first direction.

6. The fastening structure of the fiber reinforced resin-made member of claim 1, wherein said fastening member includes a bolt, a nut, and a washer, said washer comprises a flat portion and a conical protrusion portion, the flat portion being configured to be flat, in said direction crossing the first direction, in an area which surrounds a hole portion of the washer where a shaft portion of said bolt is inserted with a specified outward distance, in a radial direction, away from an edge of the hole portion of the washer, the conical protrusion portion being configured to protrude from said flat portion in one direction in an area between the flat portion and an edge of the hole portion of the washer such that a diameter of a lateral cross section thereof decreases gradually toward said edge of the hole portion from the flat portion and to be positioned inside the through hole of said fiber reinforced resin-made member, and said compression portion of the fastening member is configured to be said conical protrusion portion of the washer.

7. The fastening structure of the fiber reinforced resin-made member of claim 6, wherein said other member comprises a flat portion and a second conical protrusion portion, the flat portion being configured to be flat in an area which surrounds the hole portion thereof with a specified outward distance, in a radial direction, away from an edge of the hole portion thereof and to contact a main face of said fiber reinforced resin-made member, the second conical protrusion portion being configured to protrude from said flat portion in one direction in an area between the flat portion and the edge of the hole portion of the other member such that a diameter of a lateral cross section thereof decreases gradually toward said edge of the hole portion from the flat portion and to be positioned inside the through hole of said fiber reinforced resin-made member, and said second conical protrusion portion of the other member is a second compression portion which is different from the compression portion of said fastening member and configured to partially contact said edge portion of the through hole of the fiber reinforced resin-made member in a case where said fiber reinforced resin-made member and said other member are offset from each other in the radial direction and compress a contacted portion of the fiber reinforced resin-made member in said first direction.

8. The fastening structure of the fiber reinforced resin-made member of claim 1, wherein said other member comprises a flat portion and a second conical protrusion portion, the flat portion being configured to be flat in an area which surrounds the hole portion thereof with a specified outward distance, in a radial direction, away from an edge of the hole portion thereof and to contact a main face of said fiber reinforced resin-made member, the second conical protrusion portion being configured to protrude from said flat portion in one direction in an area between the flat portion and the edge of the hole portion of the other member such that a diameter of a lateral cross section thereof decreases gradually toward said edge of the hole portion from the flat portion and to be positioned inside the through hole of said fiber reinforced resin-made member, and said second conical protrusion portion of the other member is a second compression portion which is different from the compression portion of said fastening member and configured to partially contact said edge portion of the through hole of the fiber reinforced resin-made member in a case where said fiber reinforced resin-made member and said other member are offset from each other in the radial direction and compress a contacted portion of the fiber reinforced resin-made member in said first direction.

9. A fastening structure of a fiber reinforced resin-made member, comprising:

a fiber reinforced resin-made member;

another member overlapping with the fiber reinforced resin-made member and configured to have larger rigidity than the fiber reinforced resin-made member; and a fastening member fastening the fiber reinforced resin-made member and the other member, wherein said fiber reinforced resin-made member has a through hole penetrating in a first direction which corresponds to a direction of said overlapping and contains fibers which are arranged in a direction crossing said first direction, and said other member has a hole portion which is continuous to the through hole of said fiber reinforced resin-made member, and the other member comprises a compression portion which is configured to partially contact an edge portion of the through hole of said fiber reinforced resin-made member in a case where the fastening member is offset from the fiber reinforced resin-made member and compress a contacted portion of said fiber reinforced resin-made member in said first direction.

10. The fastening structure of the fiber reinforced resin-made member of claim 9, wherein said fastening member includes a bolt, and said other member comprises a flat portion and a conical protrusion portion, the flat portion being configured to be flat in an area which surrounds the hole portion of the other member where a shaft portion of said bolt is inserted with a specified outward distance, in a radial direction, away from an edge of the hole portion of the other member, the conical protrusion portion being configured to protrude from said flat portion in one direction in an area between the flat portion and the edge of the hole portion of the other member such that a diameter of a lateral cross section thereof decreases gradually toward said edge of the hole portion from the flat portion and to be positioned inside the through hole of said fiber reinforced resin-made member, and said compression portion of the other member is configured to be said conical protrusion portion of the other member.

* * * * *